United States Patent
Agrawal et al.

(10) Patent No.: US 12,386,555 B2
(45) Date of Patent: Aug. 12, 2025

(54) SYSTEMS, METHODS, AND DEVICES FOR QUEUE ENTRY MONITORING

(71) Applicant: Samsung Electronics Co., Ltd., Suwon-si (KR)

(72) Inventors: Vipin Kumar Agrawal, San Jose, CA (US); Daniel Lee Helmick, Broomfield, CO (US); Chun-Chu Chen-Jhy Archie Wu, San Carlos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 57 days.

(21) Appl. No.: 17/731,662

(22) Filed: Apr. 28, 2022

(65) Prior Publication Data

US 2023/0280941 A1 Sep. 7, 2023

Related U.S. Application Data

(60) Provisional application No. 63/306,079, filed on Feb. 2, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .......... G06F 2212/1016; G06F 15/163; G06F 13/1668; G06F 9/3855; G06F 9/30101; G06F 9/321; G06F 12/12–125
See application file for complete search history.

(56) References Cited

U.S. PATENT DOCUMENTS

| | | | |
|---|---|---|---|
| 9,509,335 B1 | 11/2016 | Henry | |
| 9,996,262 B1 * | 6/2018 | Nemawarkar | ........ G06F 3/0673 |
| 10,114,586 B1 * | 10/2018 | Benisty | ................... G06F 3/061 |

(Continued)

FOREIGN PATENT DOCUMENTS

| | | |
|---|---|---|
| CN | 106293990 A | 1/2017 |
| WO | 2018103452 A1 | 6/2018 |
| WO | 2018175063 A1 | 9/2018 |

OTHER PUBLICATIONS

European Extended Search Report for Application No. 23153854.7, dated Apr. 12, 2023.

*Primary Examiner* — Khoa D Doan
(74) *Attorney, Agent, or Firm* — Renaissance IP Law Group LLP

(57) ABSTRACT

A method may include receiving, at a device, an indication based on an entry submitted to a queue, obtaining, based on the indication, a measurement for the entry, encoding the measurement to generate an encoded measurement, and storing the encoded measurement. The encoding may include one or more of delta encoding, entropy encoding, or run length encoding. The method may further include modifying the measurement based on a status of the queue. The status of the queue may include an amount of entries in the queue, and the modifying the measurement may include setting the measurement to a value. The status of the queue may include an empty queue, and the modifying the measurement may include resetting the measurement. The encoding may include encoding based on one or more parameters. The method may further include determining at least one of the one or more parameters.

20 Claims, 11 Drawing Sheets

(56) References Cited

U.S. PATENT DOCUMENTS

| | | | |
|---|---|---|---|
| 10,310,810 B2 * | 6/2019 | Fukuchi | G06F 3/0659 |
| 10,466,903 B2 | 11/2019 | Benisty et al. | |
| 10,572,180 B1 | 2/2020 | Nemawarkar et al. | |
| 10,817,191 B2 | 10/2020 | Bar et al. | |
| 11,023,447 B2 * | 6/2021 | Eluri | G06F 16/22 |
| 11,030,174 B1 | 6/2021 | Hagerup | |
| 11,106,366 B1 | 8/2021 | Bhatia et al. | |
| 11,461,052 B1 * | 10/2022 | Benisty | G06F 3/0659 |
| 2017/0193028 A1 | 7/2017 | Iyengar | |
| 2017/0357666 A1 | 12/2017 | Baptist et al. | |
| 2018/0113615 A1 | 4/2018 | Park | |
| 2018/0196602 A1 | 7/2018 | Shin | |
| 2018/0275921 A1 | 9/2018 | Katagiri et al. | |
| 2019/0044637 A1 | 2/2019 | Gulstone et al. | |
| 2019/0045304 A1 | 2/2019 | Bhalla et al. | |
| 2019/0266048 A1 | 8/2019 | Schauer et al. | |
| 2020/0012451 A1 * | 1/2020 | Benisty | G06F 13/4282 |
| 2020/0117655 A1 | 4/2020 | Kong et al. | |
| 2021/0191648 A1 | 6/2021 | Karuppiah et al. | |
| 2021/0240393 A1 | 8/2021 | Jo et al. | |
| 2022/0043570 A1 * | 2/2022 | Richter | G06F 13/1668 |

* cited by examiner

SYSTEMS, METHODS, AND DEVICES FOR QUEUE ENTRY MONITORING

REFERENCE TO RELATED APPLICATION

This application claims priority to, and the benefit of, U.S. Provisional Patent Application Ser. No. 63/306,079 titled "Systems, Methods, and Devices for Command Age Tracking" filed Feb. 2, 2022 which is incorporated by reference.

TECHNICAL FIELD

This disclosure relates generally to queue management, and more specifically to systems, methods, and devices for queue entry monitoring.

BACKGROUND

A communication protocol may use one or more queues to store entries such as requests, commands, completions, and/or the like. For example, a communication protocol may allow a host to store entries in a submission queue. A device may fetch the entries from the submission queue and process the entries, for example, in a first-in-first-out order. An entry may age in the submission queue while one or more earlier stored entries are processed by the device.

The above information disclosed in this Background section is only for enhancement of understanding of the background of the inventive principles and therefore it may contain information that does not constitute prior art.

SUMMARY

A method may include receiving, at a device, an indication based on an entry submitted to a queue, obtaining, based on the indication, a measurement for the entry, encoding the measurement to generate an encoded measurement, and storing the encoded measurement. The encoding may include one or more of delta encoding, entropy encoding, or run length encoding. The method may further include modifying the measurement based on a status of the queue. The status of the queue may include an amount of entries in the queue, and the modifying the measurement may include setting the measurement to a value. The status of the queue may include an empty queue, and the modifying the measurement may include resetting the measurement. The encoding may include encoding based on one or more parameters. The method may further include determining at least one of the one or more parameters. The one or more parameters may include one or more encoding techniques. The one more parameters may include one or more settings for at least one of the one or more encoding techniques. The method may further include receiving, at the device, information about one or more entries for the queue, wherein the determining at least one of the one or more parameters may be based on at least a portion of the information. The information may be provided by a host. The information may include one or more of a number of entries for the queue, a frequency of entries for the queue, a spacing of entries for the queue, or a uniformity of entries for the queue. The method may further include determining a performance of a set of the one or more parameters, wherein the determining at least one of the one or more parameters may be based, at least in part, on the performance of the set of one or more parameters. The performance may include an efficiency of the encoding. The determining the performance may include determining, at the device, the performance. The entry may be a first entry, and the performance of the set of one or more parameters may be based on a second entry submitted to the queue. The indication may be a first indication, the measurement may be a first measurement, and the entry may be a first entry, the method may further include receiving, at the device, a second indication based on a second entry submitted to the queue, and obtaining, based on the second indication, a second measurement for the second entry, wherein the determining at least one of the one or more parameters may be based on the first measurement and the second measurement. The method may further include receiving, at the device, a third indication based on a third entry submitted to the queue, and obtaining, based on the third indication, a third measurement for the third entry, wherein the determining at least one of the one or more parameters may be based on the third measurement. The at least one of the one or more parameters may include a lossy encoding technique. The lossy encoding technique may include a logarithmic encoding technique. The queue may include a queue for a communication protocol. The queue for the communication protocol may include a submission queue for Nonvolatile Memory Express (NVMe). The entry may include a command. The measurement may include a timestamp. The storing of the encoded measurement may include storing, at the device, at least a portion of the encoded measurement.

A device may include a controller configured to receive an indication of an entry submitted to a queue, obtain, based on the indication, a measurement for the entry, encode the measurement to generate an encoded measurement, and store the encoded measurement. The device may further include a memory configured to store the encoded measurement. The device may further include a device functionality circuit configured to perform an operation based on the entry. The device may further include indication logic configured to generate the indication. The indication logic may include a doorbell register.

A system may include a host configured to submit an entry to a queue, and a device coupled to the host using a communication connection, wherein the device may be configured to receive an indication of the entry submitted to the queue, obtain, based on the indication, a measurement for the entry, encode the measurement to generate an encoded measurement, and store the encoded measurement. The host may be configured to send, using the communication connection, the indication to the device. The host may be configured to send the indication by accessing a doorbell register. The host may be configured to send, to the device, information about one or more entries for the queue. The information may include one or more of a number of entries for the queue, a frequency of entries for the queue, a spacing of entries for the queue, or a uniformity of entries for the queue.

A method may include determining, at a device, a data transfer size for an entry submitted to a queue, determining, at the device, a queue depth for the queue, and determining, at the device, based on the data transfer size and the queue depth, a workload for the queue. The method may further include sending, from the device, information about the workload for the queue. The method may further include determining, based on the workload for the queue, a timeout. The timeout may include a device timeout. The entry may be a first entry, the queue may be a first queue, the data transfer size may be a first data transfer size, the queue depth may be a first queue depth, and the queue depth may be a first queue depth, the method may further include determining, at the device, a second data transfer size for a second entry submitted to a second queue, determining, at the device, a second queue depth for the second queue, and determining, at the device, based on the first data transfer size, the second data transfer size, the first queue depth, and the second queue depth, a workload for the device. The method may further include determining, based on the workload for the device, a timeout.

A method may include receiving, at a device, an indication based on an entry submitted to a queue, obtaining, based on the indication, a measurement for the entry, determining a data transfer size for the entry, and storing the measurement and the data transfer size. The method may further include fetching the entry from the queue, and determining a data transfer size for the entry based on fetching. The method may further include encoding the measurement and the data transfer size to generate an encoded measurement and data transfer size, and storing the encoded measurement and data transfer size. The indication may be a first indication, the entry may be a first entry, and the data transfer size may be a first data transfer size, the method may further include receiving, at the device, a second indication based on a second entry submitted to the queue, obtaining, based on the second indication, a second measurement for the second entry, determining a second data transfer size for the second entry, and accumulating the first data transfer size and the second data transfer size.

A method may include receiving, at a device, an indication based on an entry submitted to a queue, obtaining, based on the indication, a measurement for the entry, fetching the entry from the queue, performing an operation based on the fetching, and storing, based on the performing, the measurement. The method may further include encoding the measurement to generate an encoded measurement, wherein the storing the measurement may include storing the encoded measurement. The method may further include determining a data transfer size for the entry, and storing, based on the performing, the data transfer size.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
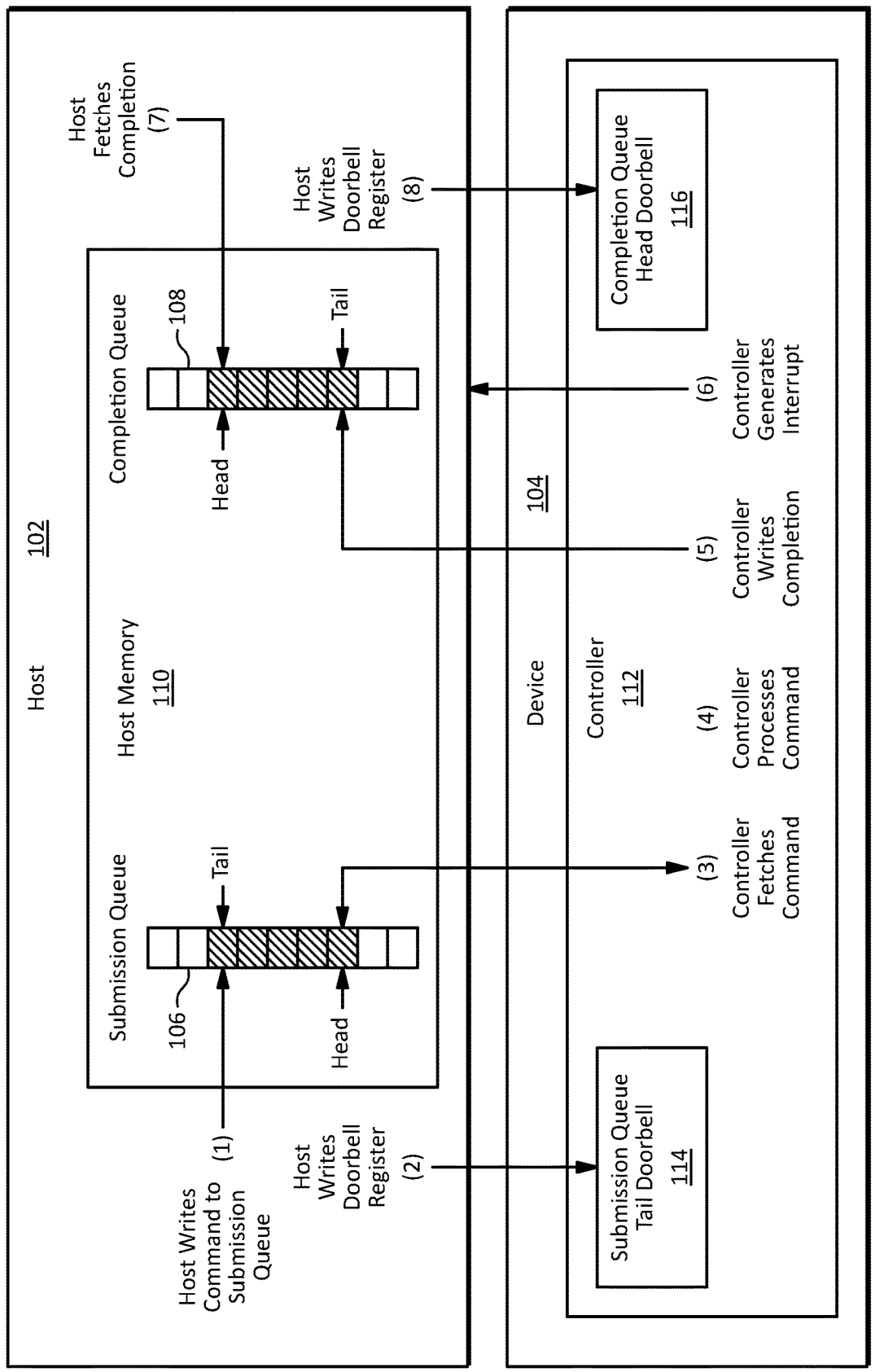
FIG. 1 illustrates an embodiment of a queue scheme for a communication protocol in accordance with example embodiments of the disclosure.

A host may store entries such as requests, commands, and/or the like, in a submission queue. A controller and/or device may fetch the entries from the submission queue and process the entries, for example, in a first-in-first-out order. Monitoring one or more entries in a queue may be useful, for example, for managing, debugging, profiling, evaluating, and/or the like, the queue and/or a system in which the queue may operate. For example, monitoring how long one or more entries have been in a queue (e.g., the ages of one or more entries) may be useful for analyzing, predicting, detecting, preventing, reporting, and/or the like, timeouts in a system having one or more queues.

Determining the age of one or more entries in a submission queue may involve storing measurements such as timestamps for one or more entries. However, depending on the implementation details, storing measurements for queue entries may consume a relatively large amount of memory in a device or other location.

This disclosure encompasses numerous inventive principles relating to monitoring queue entries. The principles disclosed herein may have independent utility and may be embodied individually, and not every embodiment may utilize every principle. Moreover, the principles may also be embodied in various combinations, some of which may amplify some benefits of the individual principles in a synergistic manner.

Some of the principles disclosed herein relate to the use of one or more encoding schemes for information relating to queue monitoring. For example, some embodiments may use one or more forms of delta encoding, entropy encoding, run length encoding, lossy encoding, and/or the like, or one or more combinations thereof, to encode one or more measurements such as timestamps for entries in a queue. Depending on the implementation details, this may compress the measurements and/or reduce the amount of memory involved with storing the measurements.

Some of the principles disclosed herein relate to schemes for determining one or more parameters for encoding information relating to queue monitoring. For example, in some embodiments, a static scheme may receive information (e.g., from a host) relating to one or more patterns of entries that may be submitted (e.g., by a host) in a queue. Based on the information, the scheme may determine one or more parameters (e.g., one or more encoding techniques, settings for encoding techniques, and/or the like) to use for encoding the information relating to queue monitoring. As another example, in some embodiments, a dynamic scheme may determine a performance of a set of one or more encoding parameters. Based on the performance, the dynamic scheme may adjust one or more of the encoding parameters.

Some of the principles disclosed herein relate to schemes for managing, debugging, profiling, evaluating, and/or the like, entries in a queue and/or a system in which the queue may operate. For example, in some embodiments, a scheme may collect and/or store data relating to queue operation. In some embodiments, the scheme may use the collected data to determine one or more workloads based on the data and/or to analyze, predict, detect, prevent, report, and/or the like, timeouts in a system having one or more queues. In some embodiments, the collected data may be encoded which, depending on the implementation details, may compress the data and/or reduce the amount of memory involved with storing the data.

Some of the principles disclosed herein relate to schemes for keeping records relating to entries in a queue and/or a system in which the queue may operate. For example, in some embodiments, a scheme may collect and/or store data relating to one or more amounts of data transferred by one or more entries, one or more timestamps or other measurements relating to one or more entries, and/or the like. In some embodiments, collected and/or stored data may be used, for example, to analyze, predict, detect, prevent, report, and/or the like, timeouts.

For purposes of illustration, some embodiments may be described in the context of some specific implementation details. However, the principles are not limited to these or any other implementation details.

FIG. 1 illustrates an embodiment of a queue scheme for a communication protocol in accordance with example embodiments of the disclosure. The embodiment illustrated in FIG. 1 may be used, for example, with a storage protocol such as Nonvolatile Memory Express (NVMe) which may use an interconnect such as Peripheral Component Interconnect Express (PCIe) and/or NVMe-over-fabric (NVMe-oF) which may use a network such as Ethernet, but the principles are not limited to these protocols, communication techniques, or any other implementation details.

The embodiment illustrated in FIG. 1 may include a host 102 and a device 104. The host may include a submission queue (SQ) 106 and a completion queue (CQ) 108 located, for example, in host memory 110. In other embodiments, the submission queue 106 and/or the completion queue 108 may be located at the device 104 and/or any other location. The device 104 may include a controller 112 that may include a submission queue tail doorbell register 114 and/or a completion queue head doorbell register 116.

In some embodiments, the submission queue 106 and/or completion queue 108 may be used, for example, to enable the device to receive and/or process one or more commands from the host 102. The submission queue 106 and/or completion queue 108 may be implemented, for example, as circular first-in-first-out (FIFO) queues in which one end of the queue may logically wrap around to the other end of the queue to enable entries to be added to, and removed from, the queue indefinitely (in some embodiments, subject to a maximum number of entries), even though the queue may be implemented with a finite linear address space. Referring to either the submission queue 106 or the completion queue 108, a slot with the oldest unfetched entry (e.g., command or completion) may be referred to as the head, and the next available unoccupied slot may be referred to as the tail.

An example embodiment of a method for receiving and/or processing one or more commands from the host 102 may proceed as follows.

At operation (1), the host 102 may place (e.g., write) one or more commands in one or more slots (e.g., one command per slot) in the submission queue 106 beginning at a slot pointed to by a tail pointer as shown in FIG. 1. (In some embodiments placing an entry in a queue may be referred to as submitting an entry in a queue, scheduling an entry in a queue, and/or updating an entry in a queue.) The tail pointer of the submission queue 106 may then be updated to point to the next available slot.

At operation (2), the host 102 may also update (e.g., write to) the submission queue tail doorbell register (SQ-TDB) 114 to initiate a process that may notify the controller 112 that one or more new commands have been placed in the submission queue 106. For example, the host 102 may write a new value of a submission queue tail entry pointer to the submission queue tail doorbell register 114.

In some embodiments, the submission queue tail doorbell register 114 may be monitored with hardware, software, or a combination thereof to provide an indication to the controller 112 that one or more new commands have been placed in the submission queue 106. For example, in some embodiments, the submission queue tail doorbell register 114 may be implemented as a hardware monitored register or memory location (e.g., location such as a PCIe location at the controller 112 and/or the device 104) that may generate an interrupt for the device 104 based on an update of the register 114. In some embodiments, an interrupt may serve as an indication to the controller 112 and/or the device 104 that one or more new commands have been placed in the submission queue 106.

In some embodiments, receiving an indication of one or more new commands being placed in the submission queue 106 may enable the controller 112 to track the number of unfetched and/or unprocessed commands that may be present in the submission queue 106. In some embodiments, this information may be used, for example, with a command arbitration process that may enable the controller 112 to determine which submission queue (if there are multiple submission queues) the controller 112 may fetch one or more commands from.

At operation (3), the controller 112 may fetch (e.g., by reading) one or more commands from the submission queue 106 beginning at a location pointed to by a head entry pointer. The head entry pointer may then be updated to point at the next (e.g., oldest) unfetched command in the submission queue 106.

In some embodiments, the scheme illustrated in FIG. 1 may implement a mechanism to enable the host 102 to track the location of the head of the submission queue 106. In some embodiments, such a mechanism may be implemented essentially as a submission queue head doorbell register, for example, using a PCIe base address register. The host 102 may use this information, for example, for wrapping the submission queue 106 to prevent a collision between the head and the tail of the submission queue 106.

At operation (4), the controller 112 may process one or more commands it has fetched from the submission queue 106. In some embodiments, the controller 112 may process one or more commands out of order. In some embodiments, fetching and/or processing may be referred to as consuming.

At operation (5), the controller 112 may place one or more completions corresponding to one or more processed commands in the completion queue 108 beginning at the next available slot which may be pointed to, for example, by a completion queue tail entry pointer as shown in FIG. 1. The completion queue tail entry pointer may then be updated to point to the next available slot in the completion queue 108. In some embodiments, a completion may include a phase tag that may be inverted from a previous entry, for example, to indicate to the host 102 that the completion queue entry (e.g., a new completion) is a new entry that is available for processing.

At operation (6), the controller 112 and/or device 104 may generate an interrupt (e.g., a pin-based interrupt, a message signaled interrupt (MSI), an extended MSI interrupt (MSI-X), and/or the like) for the host 102 to indicate to the host 102 that one or more completions have been added to the completion queue 108. In some embodiments, one or more interrupts for one or more completions may be coalesced into a smaller number of interrupts.

At operation (7), the host 102 may fetch (e.g., by reading) one or more completions from the completion queue 108 beginning at the head which may be pointed to, for example, by a completion queue head entry pointer. In some embodiments, the host 102 may process one or more of the completions it has fetched from the completion queue 108. In some embodiments, the host 102 may continue fetching and/or processing completions, for example, until it encounters a completion with a phase tag that is inverted from a phase tag of a previously fetched completion.

At operation (8), the host 102 may update (e.g., write to) the submission queue head doorbell register (CQ-HDB) 116 to initiate a process that may notify the controller 112 that one or more completions have been removed (e.g., released from) the completion queue 108 (e.g., by reading the one or more completions from the completion queue 108). For example, the host 102 may write a new value of the completion queue head entry pointer to the completion queue head doorbell register 116. In some embodiments, the host 102 may fetch and/or process one or more completions before updating the associated completion queue head doorbell register 116.

Figure 2:
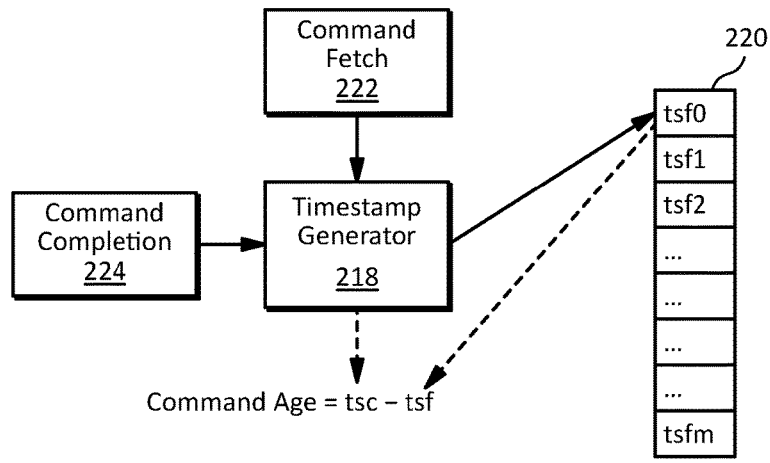
FIG. 2 illustrates an embodiment of a scheme for monitoring command age based on fetching a command in accordance with example embodiments of the disclosure.

FIG. 2 illustrates an embodiment of a scheme for monitoring command age based on fetching a command in accordance with example embodiments of the disclosure. The scheme illustrated in FIG. 2 may be implemented, for example, by a controller at a device (e.g., the controller 112 at the device 104 illustrated in FIG. 1). The controller may track the age of one or more commands in a submission queue (e.g., the submission queue 106 illustrated in FIG. 1) beginning at the time the command is fetched from the submission queue.

The embodiment illustrated in FIG. 2 may include a timestamp generator 218 and a timestamp table 220. The timestamp generator 218 may provide a timestamp (e.g., an indication of system time at a host, at the device, and/or the like) based on an event such as a command fetch 222, a command completion 224, and/or the like. For example, the controller may fetch a first command from a submission queue as shown by the command fetch event 222. Based on the command fetch event 222, the timestamp generator 218 may generate a first fetch timestamp tsf0 that may indicate a time at which the command was fetched. The controller may place the timestamp tsf0 in a first entry of the timestamp table 220, as illustrated in FIG. 2. The controller may use the timestamp generator 218 to generate one or more additional fetch timestamps tsf1, tsf2, . . . , tsfm corresponding to one or more additional commands fetched from the submission queue.

When a command is completed (e.g., at a command completion event 224), the timestamp generator 218 may generate a completion timestamp tsc corresponding to the time at which the command is completed. The age of a command at the time the command is completed may be determined by subtracting the fetch timestamp tsf from the corresponding completion timestamp as follows: Command Age=tsc-tsf. For example, the age of the first command at completion may be determined by tsc0-tsf0. In some embodiments, even if the command is not yet completed, this formula may be used to quantify the current command age. This current command age may be used, for example, for information (e.g., for debugging) and/or to initiate alternative command handling (e.g., to fail the command due to a command timeout).

In some embodiments, the number of commands that may be fetched by a controller at a device may be limited by the controller capacity at the device which, depending on the implementation details, may be smaller than the total number of entries in the multiple queues that may be accessed by a host. For example, in some embodiments, the number of entries from one or more queues initially processing in a controller at a device may be 1024-2048 entries, whereas one or more hosts may have submitted millions of outstanding submission queue entries (SQEs) over multiple queues.

As described above, a controller at a device may track the age of one or more commands in a submission queue for the device beginning at the time the command is fetched from the submission queue. However, from the perspective of a host (e.g., the host 102 illustrated in FIG. 1, and/or a driver at the host, an application running at the host, a service running at the host, and/or the like), a command may begin aging at the time the host writes the command to the submission queue. For example, in some embodiments (e.g., in an NVMe implementation), command age may be measured (e.g., for purposes of determining a command timeout) from the time a command is inserted into a submission queue until the current time.

A host may use the age of a command, for example, to detect a timeout condition. In some embodiments, a timeout may occur if a host writes a command to a submission queue for a device and the device does not indicate the command has been completed (e.g., by placing a corresponding completion in a completion queue) within a timeout period (e.g., a predetermined period of time). In the event of a timeout for a command, the host may resubmit the command to the submission queue. If the host detects a certain number of timeouts within a specific time frame, the host may clear the submission queue (e.g., by resetting the device) in an effort to determine if there is a system configuration issue, if the device may be failing, and/or the like. In this type of situation, it may be beneficial to debug the underlying issue.

In some embodiments, it may be beneficial to offload one or more timeout determinations to a device, for example, because the device and/or controller at the device may have access to information that may be useful for debugging one or more causes (e.g., a root cause) of a timeout. However, if the device and/or controller does not begin monitoring the age of a command in a submission queue until the command is fetched, there may be a discrepancy between the age of a command as determined by a host and the age of the command as determined by the device and/or controller. For example, if a host writes a command to a submission queue, the command may wait in the queue for a significant amount of time before the controller fetches the command. Thus, in some embodiments, a device and/or controller may not be able to monitor the age of a command from the perspective of a host (e.g., an end-to-end command age). Depending on the implementation details, this may make it difficult to debug a cause of a timeout event.

Figure 3:
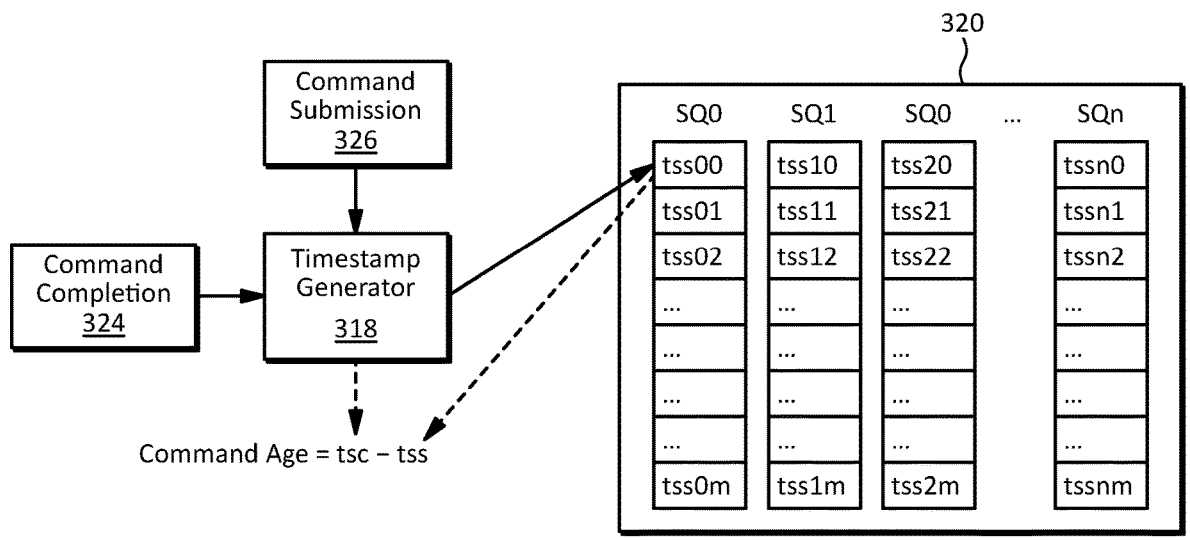
FIG. 3 illustrates an embodiment of a scheme for monitoring command age based on submitting a command to a queue in accordance with example embodiments of the disclosure.

FIG. 3 illustrates an embodiment of a scheme for monitoring command age based on submitting a command to a queue in accordance with example embodiments of the disclosure. The scheme illustrated in FIG. 3 may be implemented, for example, by a controller at a device (e.g., the controller 112 at the device 104 illustrated in FIG. 1).

In the embodiment illustrated in FIG. 3, the controller may track the age of one or more commands in a submission queue (e.g., the submission queue 106 illustrated in FIG. 1) beginning at the time the command is written to the submission queue.

The embodiment illustrated in FIG. 3 may include a timestamp generator 318 and a timestamp table 320. The timestamp generator 318 may be similar to the timestamp generator 218 illustrated in FIG. 2. The timestamp table 320 illustrated in FIG. 3 may be similar to the timestamp table 220 illustrated in FIG. 2, however, in some embodiments, the timestamp table 320 illustrated in FIG. 3 may include one or more additional columns corresponding to one or more additional submission queues SQ0, SQ1, ..., SQn. In some embodiments, some or all of the timestamp table 320 may be located in one or more memories at a device, for example, in one or more device memories, one or more controller memories (e.g., one or more controller memories that may be separate from a controller, embedded in a controller, or a combination thereof), and/or the like, or a combination thereof. As another example, in some embodiments, some or all of the timestamp table 320 may be located in one or more memories at a host. As a further example, the some or all of the timestamp table 320 may be located at a combination of one or more memories at a host, one or more memories at a device, and/or the like.

The timestamp generator 318 may provide a timestamp (e.g., an indication of system time at a host, at the device, and/or the like) based on an event such as a command submission 326, a command completion 324, and/or the like. For example, the controller may receive an indication that a command has been written to a first submission queue SQ0 (e.g., by a submission queue tail doorbell register 114 as shown in FIG. 1). Based on the command submission (e.g., command submission event 326), the controller may use the timestamp generator 318 to generate a first submission timestamp tss00 that may indicate a time at which the command was submitted. The controller may place the first submission timestamp tss00 in a first entry of the timestamp table 320 for the column associated with the first submission queue SQ0, as illustrated in FIG. 3. The controller may use the timestamp generator 318 to generate one or more additional submission timestamps tss01, tss02, ..., tss0m corresponding to additional commands submitted to the first submission queue SQ0 and/or one or more additional submission timestamps tssnm for other submission queues SQ1, SQ2, ..., SQn.

When a command is completed (e.g., at a command completion event 324), the controller may use the timestamp generator 318 to generate a completion timestamp tsc corresponding to the time at which the command is completed. The age of a command at the time the command is completed (e.g., the end-to-end age (e.g., elapsed time) beginning from the time the command was submitted to the submission queue) may be determined by subtracting the submission timestamp tss from the corresponding completion timestamp as follows: Command Age=tsc-tss. For example, the age of the first command in the first submission queue SQ0 at completion may be determined by tsc00-tss00.

One or more additional features may be implemented in a scheme for monitoring command age based on submitting a command to a queue in accordance with example embodiments of the disclosure. For example, in some embodiments, a command age may include one or more delays through, for example, one or more portions of a host, a link transmission of the indication (e.g., a doorbell, submission queue entry, and/or the like), one or more device interface delays prior to command parsing delays, and/or the like. As another example, as mentioned above with respect to embodiment illustrated in FIG. 1, receiving an indication of one or more new commands being placed in the submission queue 106 may enable the controller 112 to track the number of unfetched and/or unprocessed commands that may be present in the submission queue 106. In some embodiments, this may also enable a controller to start a timer for unfetched and/or unprocessed commands. Additionally, or alternatively, in some embodiments, such a timer may later be added and/or merged into the command parsing information where the controller learns more about the command. Depending on the implementation details, the order processing of the commands from the queue and burst information on submission queue entries may allow robust alignment of early started timers with the correct submission queue entries when they are pulled in. Thus, some embodiments may start tracking time per command prior to having knowledge of the command and/or any details of the command.

In some embodiments (e.g., an embodiment implemented with NVMe), and depending on the implementation details, a queue such as a submission queue may include up to 64K entries (and therefore up to 64K timestamps per submission queue), and up to 1024 queues. In some embodiments, a timestamp may include 64 bits of data. Thus, in some embodiments, and depending on the implementation details, storing timestamps for 1024 submission queues, each having 64K possible commands, may involve the use of 512 KB of memory per submission queue and/or 512 MB of memory for a controller. Depending on the implementation details, this may be a prohibitive amount of memory to use for timestamps.

Figure 4:
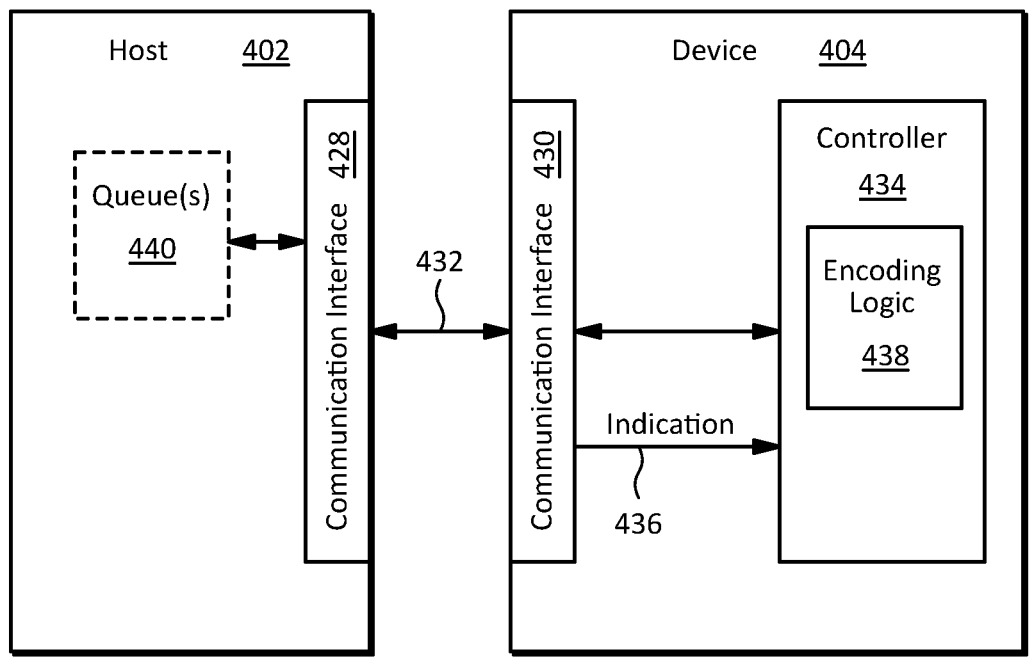
FIG. 4 illustrates an embodiment of a system having queue monitoring with encoding in accordance with example embodiments of the disclosure.

FIG. 4 illustrates an embodiment of a system having queue monitoring with encoding in accordance with example embodiments of the disclosure. The embodiment illustrated in FIG. 4 may include a host 402 and a device 404. The host 402 may include a first communication interface 428. The device 404 may include a second communication interface 430 and a controller 434. The first communication interface 428 and the second communication interface 430 may communicate through a communication connection 432.

The controller 434 may be used by the device 404 to communicate with the host 402 using a communication protocol that may use one or more queues 440 for exchanging requests, commands, completions, and/or the like between the host 402 and the device 404. In some embodiments, the one or more queues 440 may be located at the host 402 as shown in dashed outline in FIG. 4. Additionally, or alternatively, the one or more queues 440 may be located at the device 404, or at any other location. In some embodiments, the one or more queues 440 may be located partially at the host 402, partially at the device 404, and/or partially at any other location.

In some embodiments, the controller 434 may be provided with an indication 436 that the host 402 has submitted an entry to at least one of the one or more queues 440. In some embodiments, encoding logic 438 at the controller 434 may receive the indication 436 and obtain, based on the indication, a measurement (e.g., a timestamp) for the entry. The encoding logic 438 may encode the measurement to generate an encoded measurement. In some embodiments, the controller 434 may store the encoded measurement, for example, at the device 404, at the host 402 and/or at any other location.

In some embodiments, the encoding logic 438 may enable the controller 434 to implement a scheme for monitoring command age based on submitting a command to a queue in a manner similar to that illustrated in FIG. 3. For example, in some embodiments, the indication 436 may enable the controller 434 to monitor the age of one or more queue entries beginning when the entry is submitted to the queue (e.g., an end-to-end command age).

In some embodiments, the encoding logic 438 may encode one or more measurements of one or more entries submitted to the one or more queues 440 using one or more forms of encoding such as delta encoding, entropy encoding, run length encoding, lossy encoding, and/or the like, or one or more combinations thereof, some of which are described in more detail below. Depending on the implementation details, the encoding may compress the one or more measurements and/or reduce the amount of memory involved with storing the one or more encoded measurements.

Although the system illustrated in FIG. 4 is not limited to any specific implementation details, in some embodiments, the host 402 and device 404 may implement a queue scheme similar to that illustrated in FIG. 1, for example, using an NVMe protocol in which the one or more queues 440 may implement one or more submission queues and/or completion queues. In such an embodiment, the indication 436 may be provided, for example, by a doorbell mechanism (e.g., a submission queue tail doorbell register).

The host 402 may be implemented with any type of apparatus that may be configured as a host including, for example, a server such as a compute server, a storage server, storage node, a network server, and/or the like, a computer such as a workstation, a personal computer, a tablet, a smartphone, and/or the like, or any combination thereof. The device 404 may be implemented with any type of apparatus that may be configured as a device including, for example, an accelerator device, a storage device, a network device, a memory expansion and/or buffer device, a graphics processing unit (GPU), a neural processing unit (NPU), a tensor processing unit (TPU), and/or the like, or any combination thereof.

The first communication interface 428, the second communication interface 430, and/or the communication connection 432 may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication connection 432 may include a communication fabric including one or more links, buses, switches, hubs, nodes, routers, translators, repeaters, and/or the like. In some embodiments, the system illustrated in FIG. 4 may include one or more additional apparatus having one or more additional communication interfaces connected using the communication connection 432 and/or an extension thereof.

In an embodiment in which the device 404 is implemented as a storage device, the storage device may include any type of nonvolatile storage media based, for example, on solid state media (e.g., a solid state drive (SSD)), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

As mentioned above, the encoding logic 438 may implement one or more encoding schemes, or a combination thereof, to encode one or more measurements of one or more entries submitted to the one or more queues 440 which, depending on the implementation details, may compress the measurements and/or reduce the amount of memory involved with storing the measurements. Some examples of such encoding schemes may be as follows.

Some encoding schemes in accordance with example embodiments of the disclosure may relate to granularity, quantization, dynamic range, delta encoding, resetting, and/or the like, of measurements such as timestamps. For example, in some embodiments, system time at a host or a device may be tracked at a granularity measured in nanoseconds. Moreover, system time may be tracked in terms of power-on time for a host or device which may extend over time spans measured in years. Tracking system time at these small granularities for these extended periods of time (e.g., at a large dynamic range) may require a timestamp having more than 32 bits (e.g., 64 bits).

However, in some embodiments, a timeout period for an entry in a queue may be measured in terms of seconds. For example, in some embodiments, a host may consider a command submitted to an NVMe submission queue to have timed out if it is not processed (e.g., if a completion is not received) within one or two seconds. Moreover, in some embodiments, a host may not need, or be able, to measure a timeout at a granularity of less than milliseconds. Thus, in some example embodiments, the dynamic range involved with determining a timeout may only be about 14 bits (e.g., a range of 16 seconds (to provide a safety margin when measuring a range of a few seconds) at a granularity of 1 ms). In an example system having queues with up to 64K entries per queue, and up to 1024 queues per controller, this may only involve the use of 112 KB of memory per queue or 112 MB of memory for the controller.

Additionally, in some embodiments, determining a timeout for a queue entry may only involve relative time rather than absolute system time. For example, in some embodiments, a system timestamp generator may keep track of time, possibly measured in years, beginning when a host or device is powered up. However, for purposes of determining a timeout for a queue entry, the absolute system time may not matter. Instead, the end-to-end age of an entry in a queue may be measured beginning when the entry is submitted to the queue and a doorbell update is provided to the controller. Therefore, in some embodiments, a timestamp for an empty queue may constantly be reset (e.g., to zero) as long as the queue is empty. This may be referred to as resetting the timestamp at the head of the queue. The submission timestamp for the first entry submitted to the queue may then be zero (e.g., tss0=zero for SQ0 in the example illustrated in FIG. 3), and subsequent timestamps may be determined relative to the zero value for the first timestamp. Depending on the implementation details, this may reduce the number of bits involved in monitoring the ages of entries in a queue because time may be measured relative to zero beginning with the first entry in a queue rather than an absolute system time for the first entry which may involve many bits. In some embodiments, a measurement (e.g., a timestamp) may be modified based on a status of a queue in any manner that may, for example, reduce an amount of data (e.g., a number of bits) involved in monitoring queue entries. For example, in some situations, the status of a queue may be empty or nearly empty. In some embodiments, based on the status of a queue being empty or nearly empty, a timestamp may be set to any value, e.g., zero or some relatively low value, that may reduce the number of bits involved in measuring and/or storing the end-to-end age of an entry in a queue.

In some embodiments, the starting point for determining the age of a queue entry may depend on the details of how the entry is placed in the queue, and/or how an indication is provided to a controller and/or device. For example, in some embodiments, a new entry may be inserted into a submission queue, and a doorbell indication may then be provided to a device and/or controller to inform the device that the new entry is present in the submission queue. A timer may be started at the time the device receives the doorbell indication. Depending on the implementation details, there may be one or more (possibly many) writes and/or modifications to the new entry in the submission queue before the doorbell indication is provided to the device informing it of the new entry. As another example, in some embodiments, a host may insert a new entry into a submission queue, and some time may then pass before a doorbell indication is provided to the device and/or controller at the device (e.g., by the host) informing it of the new entry. As a further example, in some embodiments, a host may provide a burst update to a device and/or controller at a device. For example, multiple entries (e.g., ten entries) may be created and filled into the queue (e.g., by a host) before a doorbell indication is provided to the device and/or controller at the device (e.g., by the host) informing it of the multiple new entries.

Moreover, in some embodiments, delta encoding may be used, for example, such that a timestamp for a subsequent queue entry may be measured relative to a previous entry rather than the beginning of the queue.

Figure 5:
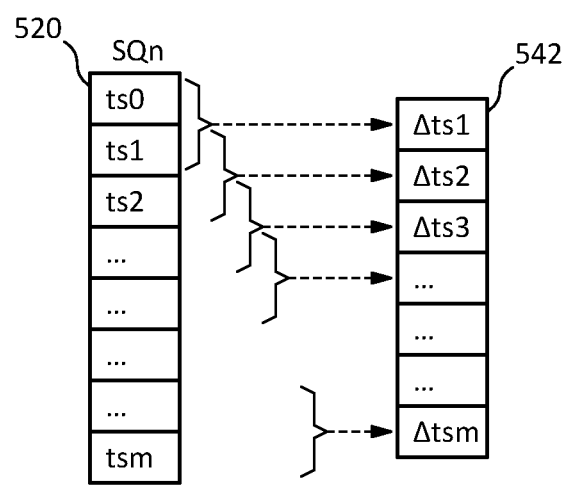
FIG. 5 illustrates an example embodiment of delta encoding for timestamps for queue entries in accordance with example embodiments of the disclosure.

FIG. 5 illustrates an example embodiment of delta encoding for timestamps for queue entries in accordance with example embodiments of the disclosure. In the embodiment illustrated in FIG. 5, a first timestamp ts0 for the submission time of a first entry in a table 520 for a submission queue SQn may have an absolute initial value (e.g., an absolute value of system time or a value of zero if the timestamp is reset to zero at the head of the queue). However, rather than storing one or more subsequent stamps ts1, ts2, . . . tsm for the submission times of one or more subsequent entries in the table 520 submission queue SQn, a table of differential times (e.g., time deltas) 542 may be used to store the change in value in the timestamps between one or more (e.g., successive entries).

For example, in some embodiments, the table of time deltas 542 may not have an entry for the first entry in the submission queue SQn because it may be assumed to be zero. A time delta for the second entry in the submission queue SQn may be stored in the first entry $\Delta ts1$ in the table of time deltas 542 as the difference between the timestamp for the first entry (e.g., ts0) in the submission queue SQn and the timestamp for the second entry (e.g., ts1) in the submission queue SQn. That is, $\Delta ts1=ts1-ts0$. Similarly, a time measurement entry for the third entry in the submission queue SQn may be stored in the second entry $\Delta ts2$ in the table of time deltas 542 as the difference between the timestamp for the second entry (e.g., ts1) in the submission queue SQn and the timestamp for the third entry (e.g., ts2) in the submission queue SQn. That is, $\Delta ts2=ts2-ts1$.

Depending on the implementation details, the use of larger timestamp granularity, timestamp resetting, and/or delta encoding may reduce the amount of memory involved with storing timestamp and/or other measurement information for queue entries. In some embodiments, there may be multiple reasons for the potential memory reduction provided by these methods. First, the values of the time deltas (e.g., $\Delta ts1, \Delta ts2, \ldots, \Delta tsm$) may be smaller and/or have a smaller dynamic range and therefore involve the use of less memory space. Second, a pattern of time delta values resulting from a pattern of accesses of a queue by a host may provide opportunities for further compression using one or more additional encoding schemes. For example, in some embodiments, a host may write entries to a submission queue in bursts of closely spaced writes separated by longer time gaps with no accesses. If the writes in a burst are spaced closely enough that they occur within the timestamp granularity (e.g., 1 ms), then many of the time deltas between successive writes may be zero. Therefore, a table of time deltas may include a relatively large number of zeros (or other small values such as one), many of which may be adjacent. In some embodiments, data patterns with relatively large numbers or identical and/or adjacent values may be efficiently encoded using various encoding schemes such as entropy encoding, run length encoding, and/or the like as described below.

Some additional encoding schemes in accordance with example embodiments of the disclosure may relate to entropy encoding such as Huffman encoding. In some embodiments, entropy encoding may determine (e.g., measure, estimate, and/or the like) the probability of a symbol occurring in a sequence of data and use shorter codes (e.g., a smaller number of bits) to encode the more frequent symbols.

Table 1 illustrates an example embodiment of Huffman codes that may be used to encode delta timestamp measurements for entries in a queue in accordance with example embodiments of the disclosure. In the embodiment illustrated in Table 1, the x's may indicate standard binary encoded values for the corresponding portion of the timestamp.

The codes selected for use in Table 1 may be based on one or more of the following potential characteristics of a probability distribution of delta timestamps for entries in a submission queue. (1) A relatively large portion of queue entries (e.g., most queue entries) may be submitted closely in time (e.g., in one or more bursts of activity by one or more applications running, for example, on virtual machines (VMs)) with relatively large time gaps between bursts (e.g., for idle VMs). (2) For empty queues caused, for example, by idle VMs, timestamps may be reset to zero at the head of a queue. (3) A relatively large number of queue entries may have the same timestamp and/or delta timestamp value (e.g., because of being spaced closely in time).

In some embodiments, queue entries may be monitored in one or more monitoring windows (which may also be referred to as tracking windows). In such embodiments, a relatively large number of queue entries may have the same timestamp and/or delta timestamp value within a tracking window and/or in a subsequent (e.g., the next) tracking window. In other embodiments, a probability distribution of delta timestamps may have different characteristics, and therefore, different arrangements of codes may be used.

TABLE 1

| Δtimestamp | Number of bits | Code |
| --- | --- | --- |
| 0 | 1 | 0 |
| 1 | 2 | 10 |
| <16 | 7 | 110<xxxx> |
| <256 | 12 | 1110<xxxxxxxx> |
| ≥256 | 18 | 1111<xxxxxxxxxxxxxx> |

Figure 6:
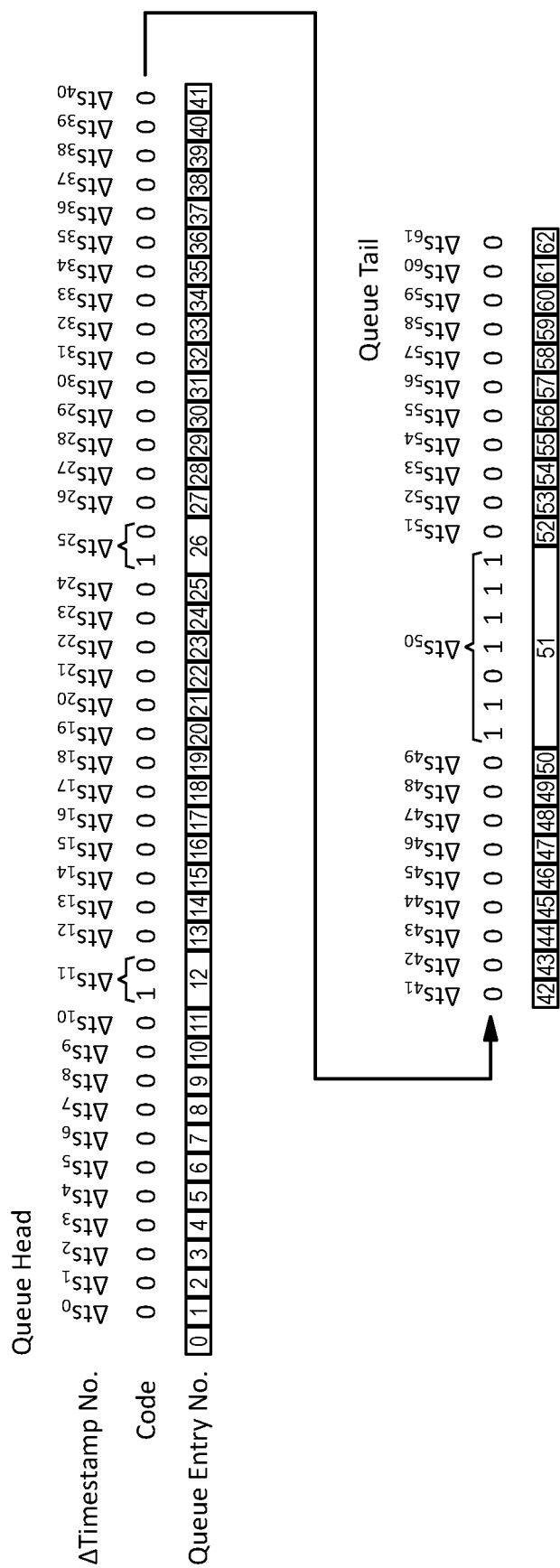
FIG. 6 illustrates an example embodiment of Huffman encoding for an example sequence of queue entries in accordance with example embodiments of the disclosure.

FIG. 6 illustrates an example embodiment of Huffman encoding for an example sequence of queue entries in accordance with example embodiments of the disclosure. The embodiment illustrated in FIG. 6 may use, for example, the codes illustrated in Table 1.

The embodiment illustrated in FIG. 6 includes an example sequence of 63 queue entries (Queue Entry Nos. 0 through 62). The first queue entry (Queue Entry No. 0) may not have a code or a delta timestamp because it may be assumed to be zero due to resetting the timestamp at the head of the queue when it is empty. The next 11 queue entries (Queue Entry Nos. 1 through 11) may have delta timestamps of zero ($\Delta$ts0=0, $\Delta$ts1=0, . . . , $\Delta$ts10=0) because the next 11 queue entries may be submitted to the queue within an amount of time equal to the timestamp granularity after the first queue entry (Queue Entry No. 0) was submitted. Therefore, the codes for Queue Entry Nos. 1 through 11 may all be zeros.

Queue Entry No. 12 may have a delta timestamp equal to one unit of granularity, for example, because Queue Entry No. 12 may be submitted to the queue at a time equal to, or shortly after, an amount of time equal to the timestamp granularity after the first queue entry (Queue Entry No. 0) was submitted to the queue. Referring to Table 1, the encoding for one unit of granularity may be "10" (e.g., $\Delta$ts11=10). Thus, the code for Queue Entry No. 12 is shown as 10 in FIG. 6.

The next 13 queue entries (Queue Entry Nos. 13 through 25) may have delta timestamps of zero ($\Delta$ts12=0, $\Delta$ts13=0, . . . , $\Delta$ts24=0) because the next 13 queue entries may be submitted to the queue within an amount of time equal to the timestamp granularity after Queue Entry No. 12 was submitted to the queue.

Queue Entry No. 26 may have a delta timestamp equal to one unit of granularity, for example, because Queue Entry No. 26 may be submitted to the queue at a time equal to, or shortly after, an amount of time equal to the timestamp granularity after Queue Entry No. 12 was submitted to the queue. Thus, the code for Queue Entry No. 26 is shown as 10 in FIG. 6.

The next 24 queue entries (Queue Entry Nos. 27 through 50) may have delta timestamps of zero ($\Delta$ts26=0, $\Delta$ts27=0, . . . , $\Delta$ts49=0) because Queue Entry Nos. 27 through 50 may be submitted to the queue within an amount of time equal to the timestamp granularity after Queue Entry No. 26 was submitted to the queue.

Queue Entry No. 51 may have a delta timestamp equal to fifteen units of granularity, for example, because Queue Entry No. 51 may be submitted to the queue at a time equal to, or shortly after, an amount of time equal to fifteen units of timestamp granularity after Queue Entry No. 26 was submitted to the queue. Referring to Table 1, the encoding for fifteen units of granularity may be "1101111" (110<xxxx> where xxxx=1111 for the decimal value fifteen). Thus, the code for Queue Entry No. 51 is shown as 1101111 in FIG. 6.

The next 11 queue entries (Queue Entry Nos. 52 through 62) may have delta timestamps of zero ($\Delta$ts51=0, $\Delta$ts52=0, . . . , $\Delta$ts61=0) because the next 11 queue entries may be submitted to the queue within an amount of time equal to the timestamp granularity after Queue Entry No. 51 was submitted to the queue.

For purposes of illustration, and based on the example delta timestamps illustrated in FIG. 6, if the timestamp granularity is assumed to be 1 ms, then Queue Entry Nos. 1 through 11 may be submitted to the queue within 1 ms of the first queue entry (Queue Entry No. 0) being submitted to the queue. Similarly, Queue Entry Nos. 13 through 25 may be submitted to the queue within 1 ms of Queue Entry No. 12 being submitted to the queue.

In some embodiments, the string of codes illustrated in FIG. 6 may be updated when an entry is submitted (e.g., inserted) at the tail of the queue. In some embodiments, the timestamp for a command entry may be calculated, for example, at the time of fetch from the string illustrated in FIG. 6.

In the example embodiment illustrated in FIG. 6, the string of codes used to represent the delta timestamps for the 63 queue entries may be 71 bits long. Assuming, for purposes of illustration, that a timestamp for a queue entry that does not use the methods illustrated in FIG. 6 may use 32 bits of data, the compression ratio provided by the methods illustrated in FIG. 6 may be given by 63×32/71≈28. Thus, depending on the implementation details, the methods illustrated in FIG. 6 may reduce the amount of memory involved in storing timestamp data by a factor of 28. The example embodiment illustrated in FIG. 6, however, is not limited to these or any other specific implementation details.

Some additional encoding schemes in accordance with example embodiments of the disclosure may relate to run length encoding. In some embodiments, run length encoding may replace a sequence of repeating data patterns with a single copy of the pattern and a count indicating how many times the pattern repeats.

Figure 7:
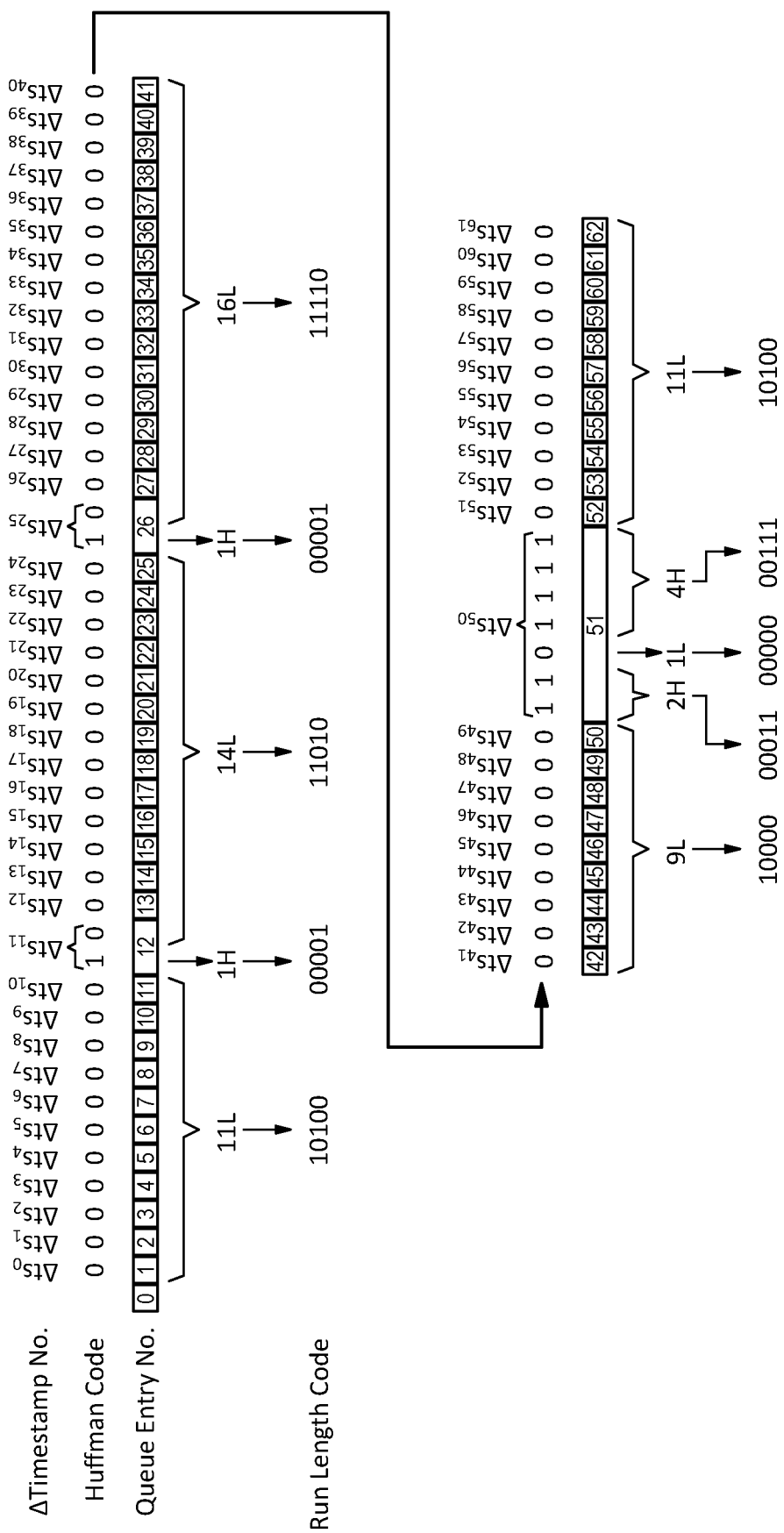
FIG. 7 illustrates a first example embodiment of entropy encoding combined with run length encoding for an example sequence of queue entries in accordance with example embodiments of the disclosure.

FIG. 7 illustrates a first example embodiment of entropy encoding combined with run length encoding for an example sequence of queue entries in accordance with example embodiments of the disclosure. For purposes of illustration, the embodiment illustrated in FIG. 7 is shown as being applied to the resulting Huffman encoding illustrated in FIG. 6. However, in other embodiments, run length encoding may be applied directly to the sequence of queue entries, or in combination with one or more other encoding schemes.

The embodiment illustrated in FIG. 7 may implement fixed length codes which, in this example, may be five bits long. The first four bits of the 5-bit code may be a count of the number of consecutive bits, and the last bit of the 5-bit code may indicate whether the consecutive bits are high (1) or low (0). In some embodiments, the count provided by the first four bits may be implemented with a binary encoding of the count minus one (count-1) because there may be no need to encode a count of zero.

Referring to FIG. 7, the first repeating pattern in the Huffman code may be a sequence of eleven zeros (which may be indicated as 11L). Thus, the run length encoding may replace the first eleven bits of zero in the Huffman code with the run length code "10100" where the leading four bits "1010" is a binary encoding of eleven (minus one), and the final bit "0" indicates the repeating pattern is zeros.

The next pattern in the Huffman code may be a single one (which may be indicated as 1H). The run length encoding may replace the single one in the Huffman code with the run length code "00001" where the leading four bits "0000" is a binary encoding of one (minus one), and the final bit "1" indicates the repeating pattern is ones.

The next pattern in the Huffman code may be a sequence of fourteen zeros (which may be indicated as 14L). Thus, the run length encoding may replace the next fourteen bits of zero in the Huffman code with the run length code "11010" where the leading four bits 01101" is a binary encoding of fourteen (minus one), and the final bit "0" indicates the repeating pattern is zeros.

The next pattern in the Huffman code may be a single one (which may be indicated as 1H). The run length encoding may replace the single one in the Huffman code with the run length code "00001" where the leading four bits "0000" is a binary encoding of one (minus one), and the final bit "1" indicates the repeating pattern is ones.

The next pattern in the Huffman code may be a sequence of 25 zeros. However, because the four counter bits may support a maximum count of sixteen, the sequence may be broken up into two successive sequences of sixteen zeros and nine zeros (which may be indicated as 16L and 9L). Thus, the run length encoding may replace the sequence of 25 zeros with a first run length code "11110" where the leading four bits "1111" is a binary encoding of sixteen (minus one), and the final bit "O" indicates the repeating pattern is zeros, and a second run length code of "10000" where the leading four bits "1000" is a binary encoding of nine (minus one), and the final bit "0" indicates the repeating pattern is zeros.

The next pattern in the Huffman code may be a sequence of two ones (which may be indicated as 2H). The run length encoding may replace the next two bits of one in the Huffman code with the run length code "000011" where the leading four bits "0001" is a binary encoding of two (minus one), and the final bit "1" indicates the repeating pattern is ones.

The next pattern in the Huffman code may be a single zero (which may be indicated as 1L). The run length encoding may replace the single zero in the Huffman code with the run length code "00000" where the leading four bits "0000" is a binary encoding of one (minus one), and the final bit "O" indicates the repeating pattern is zero.

The next pattern in the Huffman code may be a sequence of four ones (which may be indicated as 4H). The run length encoding may replace the next four bits of one in the Huffman code with the run length code "00111" where the leading four bits "0011" is a binary encoding of four (minus one), and the final bit "1" indicates the repeating pattern is ones.

The final repeating pattern in the Huffman code may be a sequence of eleven zeros (which may be indicated as 11L). The run length encoding may replace the first eleven bits of zero in the Huffman code with the run length code "10100" where the leading four bits "1010" is a binary encoding of eleven (minus one), and the final bit "0" indicates the repeating pattern is zeros.

In the example embodiment illustrated in FIG. 7, the resulting run length code may have 50 bits. This may be compared to the 71 bits used by the Huffman encoding alone as shown in FIG. 6. Thus, the run length encoding may provide an additional compression ratio of 71/50=1.4. Depending on the implementation details, the combination of Huffman encoding and run length encoding illustrated in FIG. 7 may reduce the memory space by a factor of 63×32/50≈40. The example embodiment illustrated in FIG. 7, however, is not limited to these or any other specific implementation details.

Figure 8:
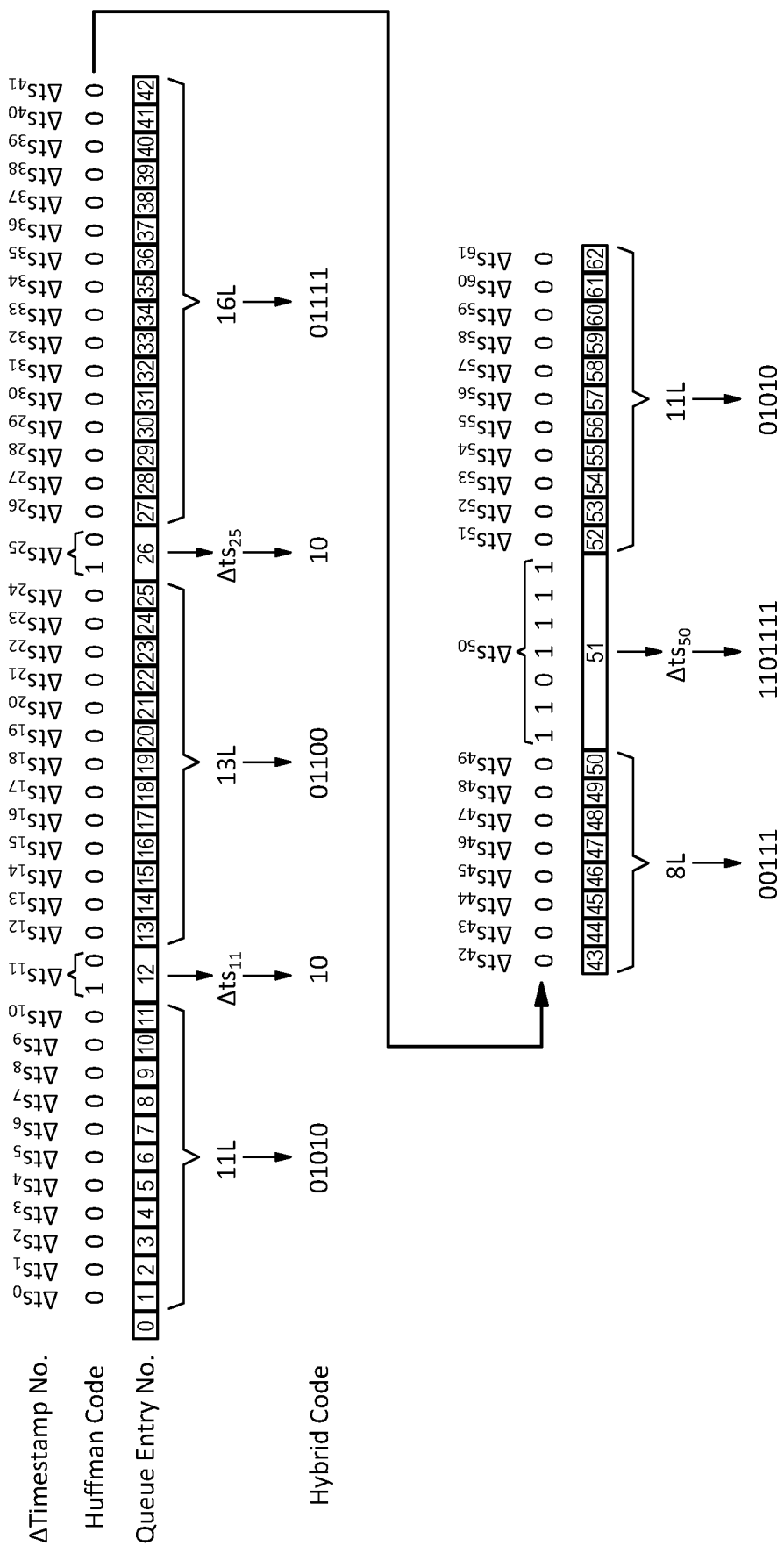
FIG. 8 illustrates a second example embodiment of entropy encoding combined with run length encoding for an example sequence of queue entries in accordance with example embodiments of the disclosure.

FIG. 8 illustrates a second example embodiment of entropy encoding combined with run length encoding for an example sequence of queue entries in accordance with example embodiments of the disclosure. In the embodiment illustrated in FIG. 8, the run length encoding may be integrated into Hoffman encoding rather than being applied after the Huffman encoding. In some embodiments, this may be referred to as a hybrid code.

Table 2 illustrates an example embodiment of combined Huffman codes and run length codes that may be used to encode delta timestamp measurements for queue entries in the embodiment illustrated in FIG. 8. In the embodiment illustrated in Table 2, the x's may indicate standard binary encoded values for the corresponding portion of the timestamp.

TABLE 2

| Δtimestamp | Number of bits | Code |
|---|---|---|
| 0 | Variable | Use fixed-size run length encoding with a prefix of zero and a 4-bit counter |
| 1 | 2 | 10 |
| <16 | 7 | 110<xxxx> |
| <256 | 12 | 1110<xxxxxxxx> |
| ≥256 | 18 | 1111<xxxxxxxxxxxxxx> |

Referring to FIG. 8, the first queue entry (Queue Entry No. 0) may not have a code or a delta timestamp because it may be assumed to be zero due to resetting the timestamp at the head of the queue when it is empty. The next 11 queue entries (Queue Entry Nos. 1 through 11) may have delta timestamps of zero ($\Delta ts0=0$, $\Delta ts1=0$, ..., $\Delta ts10=0$). Therefore, based on Table 2, Queue Entry Nos. 1 through 11 may be encoded with run length encoding. Thus, the hybrid code output for Queue Entry Nos. 1 through 11 may be the run length code "01010" where the leading bit "0" indicates the repeating pattern is zeros and the last four bits "1010" is a binary encoding of eleven (minus one).

The next queue entry (Queue Entry No. 12) may have a delta timestamp equal to one. Based on Table 2, the encoding for one may be "10" (e.g., Δts11=10). Thus, the hybrid code for Queue Entry No. 12 is shown as 10 in FIG. 8.

The next 13 queue entries (Queue Entry Nos. 13 through 25) may have delta timestamps of zero (Δts12=0, Δts13=0, . . . , Δts24=0). Based on Table 2, Queue Entry Nos. 13 through 25 may be encoded with run length encoding. Thus, the hybrid code output for Queue Entry Nos. 13 through 25 may be the run length code "01100" where the leading bit "0" indicates the repeating pattern is zeros and the last four bits "1100" is a binary encoding of zeros encoding.

The next queue entry (Queue Entry No. 26) may have a delta timestamp of one. Based on Table 2, the encoding for one may be "10" (e.g., Δts25=10). Thus, the hybrid code for Queue Entry No. 26 may be 10 as shown in FIG. 8.

The next 24 queue entries (Queue Entry Nos. 27 through 50) may have delta timestamps of zero (Δts26=0, Δts27=0, . . . , Δts49=0). Thus, based on Table 2, Queue Entry Nos. 27 through 50 may be encoded with run length encoding. However, because the four counter bits may support a maximum count of sixteen, the sequence may be broken up into two successive sequences of sixteen zeros and eight zeros. Thus, the hybrid output encoding may include a first run length code "01111" where the leading bit "0" indicates the repeating pattern is zeros and the last four bits "1111" is a binary encoding of sixteen (minus one), and a second run length code "00111" where the leading bit "0" indicates the repeating pattern is zeros and the last four bits "0111" is a binary encoding of eight (minus one).

Queue Entry No. 51 may have a delta timestamp of fifteen. Based on Table 2, the encoding for fifteen may be "1101111" (e.g., Δts51=1101111). Thus, the hybrid code for Queue Entry No. 51 may be 1101111 as shown in FIG. 8.

The next 11 queue entries (Queue Entry Nos. 52 through 62) may have delta timestamps of zero (Δts51=0, Δts52=0, . . . , Δts61=0). Based on Table 2, Queue Entry Nos. 52 through 62 may be encoded with run length encoding. Thus, the hybrid code output for Queue Entry Nos. 52 through 62 may be the run length code "01010" where the leading bit "0" indicates the repeating pattern is zeros and the last four bits "1010" is a binary encoding of eleven (minus one).

In the example embodiment illustrated in FIG. 8, the resulting hybrid code may have 36 bits. This may be compared to the 71 bits used by the Huffman encoding alone as shown in FIG. 6. Thus, the run length encoding may provide an additional compression ratio of 71/36≈2. Depending on the implementation details, the hybrid Huffman encoding and run length encoding illustrated in FIG. 8 may reduce the memory space by a factor of 63×32/36≈56. The example embodiment illustrated in FIG. 8, however, is not limited to these or any other specific implementation details.

In some embodiments, one or more measurements relating to queue entries may be encoded using one or more compressive techniques that may implement a tradeoff between storage space and accuracy. For example, some embodiments may use one or more nonlinear algorithms such as logarithms, exponentials, and/or the like, rounding, and/or the like. Such encoding schemes may be useful, for example, with relatively large values of measurements such as timestamps and/or Δtimestamp for which accuracy may not be as useful, and for which it may be beneficial to trade some accuracy for more compact encoding.

Table 3 illustrates a set of codes that may be used to encode queue entry measurements such as timestamps in accordance with example embodiments of the disclosure. A Δtimestamp having a value in the decimal range shown in the first column in Table 3 may be encoded using the corresponding binary code shown in the same row of the second column of Table 3.

For example, if a Δtimestamp for a queue entry has a decimal value of 10, the Δtimestamp may be encoded using the binary code "11" which, as indicated in the third column of Table 3, may be interpreted as a decimal value of 8. (A binary value of 11 corresponds to the decimal value 3, and decimal $2^3$=8.) Thus, the encoding for the decimal value of 10 may have an error (e.g., loss of accuracy) of decimal 2 because decimal 10 may be encoded as binary 11, which may later be interpreted as decimal 8.

Because decimal values between 8 and 15 may be encoded using the binary code "11" which, as indicated in Table 3, may be interpreted as a decimal value of 8, the potential loss of accuracy for Δtimestamps in the decimal range of 8 through 15 may be as low as zero (for a Δtimestamp of 8) to as high as 7 (for a Δtimestamp of 15).

In some embodiments, the codes illustrated Table 3 may be described as a round down implementation because Δtimestamp values that fall between the decimal interpretations of two different binary codes may be rounded down to the next lowest binary code. Other embodiments may use round up and/or other techniques.

In some embodiments, the codes illustrated Table 3 may be described as implementing a logarithmic (log) scale encoding scheme. In some embodiments, the codes illustrated Table 3 may be described as implementing a lossy encoding scheme because, for example, and depending on the implementation details, the original values of the Δtimestamp values may not be recovered without loss of accuracy. In some embodiments, however, the loss of accuracy may not be due directly to the logarithmic nature of the encoding scheme, but rather, may be caused by the rounding used to implement the scheme.

TABLE 3

| Δtimestamp (Decimal) | Code to Use (Binary) | Interpretation of Code (Decimal) | Loss of Accuracy (Decimal) |
|---|---|---|---|
| 0 | 0 | 0 | 0 |
| 1-3 | 1 | $2^1$ = 2 | 0 to 1 |
| 4-7 | 10 | $2^2$ = 4 | 0 to 3 |
| 8-15 | 11 | $2^3$ = 8 | 0 to 7 |
| 16-31 | 100 | $2^4$ = 16 | 0 to 15 |
| 32-63 | 101 | $2^5$ = 32 | 0 to 31 |
| 64-127 | 110 | $2^6$ = 64 | 0 to 63 |
| 128-255 | 111 | $2^7$ = 128 | 0 to 127 |
| . . . | . . . | . . . | . . . |

Table 4 illustrates some examples of decimal Δtimestamp values (first column) along with a standard binary representation (second column) and a representation using the codes illustrated in Table 3. As may be illustrated in Table 4, and depending on the implementation details, the encoding scheme illustrated in Table 3 may provide codes that may be substantially smaller, and therefore use substantially less memory space to store, while still providing acceptable accuracy for purposes of monitoring the age or other measurements of queue entries. For example, a Δtimestamp having a decimal value of 34 may be represented by the binary code "101" which may be half the length of the standard binary representation of "100010." As another example, a Δtimestamp having a decimal value of 125 may be represented by the binary code "110" which may be less than half the length of the standard binary representation of "1111101."

TABLE 4

| Δtimestamp | Standard Binary Representation | Binary Code from Table 3 |
|---|---|---|
| 0 | 0 | 0 |
| 34 | 100010 | 101 |
| 4 | 100 | 10 |
| 2 | 10 | 1 |
| 125 | 1111101 | 110 |

Although the encoding techniques disclosed herein are not limited to any specific applications and/or implementations, one or more of the encoding techniques, or combinations thereof, may be especially beneficial when applied to monitoring the ages of commands submitted to one or more submission queues in a storage protocol such as NVMe. For example, in some embodiments, times during which a queue may be empty may not be relevant to debugging command timeouts, and therefore, resetting timestamps at the head of a queue may be an effective technique to reduce the amount of memory used to store measurements relating to command age. Moreover, delta encoding may further reduce the memory usage. As another example, in some embodiments, NVMe commands may be placed in a submission queue in bursts of closely spaced writes separated by relatively long periods of little or no activity (e.g., due to idle VMs). This may result in a pattern of timestamps that may be efficiently encoded with entropy encoding such as Huffman encoding. Moreover, the relatively long sequences of repeated timestamps may be efficiently encoded with run length encoding. As a further example, in some embodiments, the memory involved in storing the relatively long time deltas between some NVMe commands may be further reduced using a lossy encoding scheme such as logarithmic encoding (e.g., with rounding) while still maintaining adequate accuracy.

Figure 9:
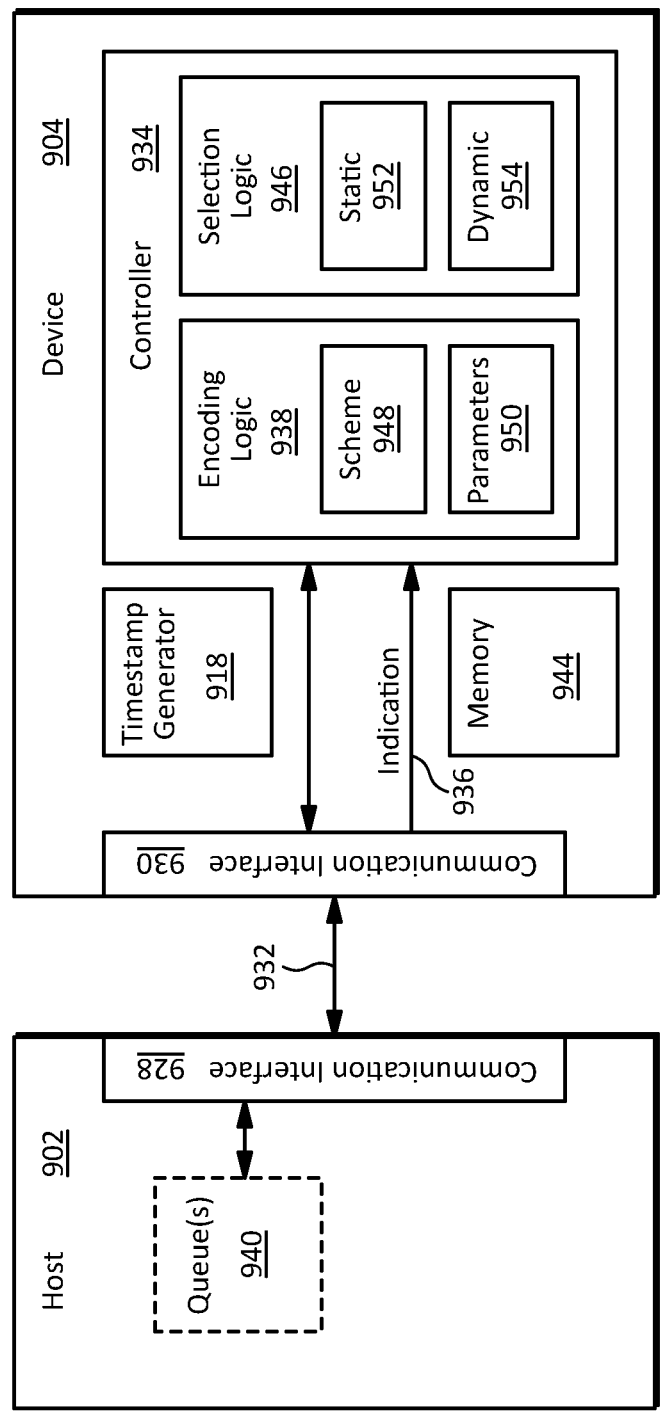
FIG. 9 illustrates an example embodiment of a system having queue monitoring with encoding in accordance with example embodiments of the disclosure.

FIG. 9 illustrates an example embodiment of a system having queue monitoring with encoding in accordance with example embodiments of the disclosure. The embodiment illustrated in FIG. 9 may be used, for example, to implement the embodiment illustrated in FIG. 4.

The embodiment illustrated in FIG. 9 may include a host 902 and a device 904. The host 902 may include a first communication interface 928. The device 904 may include a second communication interface 930 and a controller 934. The first communication interface 928 and the second communication interface 930 may communicate through a communication connection 932. For purposes of illustration, one or more queues 940 are shown at host 902, but the one or more queues 940 may be located partially or entirely at the controller 934 at the device 904 or at any other location.

The device 904 may also include a timestamp generator 918 and/or a local memory 944. In some embodiments, the timestamp generator 918 and/or local memory 944 may be partially or entirely included in the controller 934. The controller 934 may include encoding logic 938 and selection logic 946. The encoding logic 938 may be configured to implement one or more encoding schemes 948 using one or more parameters 950. For example, the one or more encoding schemes 948 may include any of the encoding schemes described above including measurement granularity and/or quantization, resetting a measurement based on a state of a queue (e.g., resetting a timestamp at the head of a queue), delta encoding, entropy encoding such as Huffman encoding, run length encoding, logarithmic encoding, rounding, and/or the like. In some embodiments, an encoding scheme 948 may also be referred to as an encoding technique, and a parameter 950 may also be referred to as a setting (e.g., for an encoding scheme or technique). In some embodiments, an encoding scheme 948 may also be referred to as a parameter.

In some embodiments, the encoding logic 938 may be configured to obtain a measurement (e.g., a timestamp from the timestamp generator 918) for an entry in a queue 940 based on receiving an indication 936 that the entry has been submitted to the queue 940. The encoding logic may be configured to encode the measurement using the one or more encoding schemes 948 using one or more parameters 950, and store the encoded measurement, for example, in the local memory 944.

The selection logic 946 may be configured to select one or more of the encoding schemes 948 and/or parameters 950. For example, in some embodiments, the selection logic 946 may be configured to monitor entries being submitted to a queue (e.g., by monitoring tail doorbell updates received as indications 936) and, based on the monitoring, determine one or more of: (1) whether to use run length encoding for compression of timestamps for the entries; (2) if using run length encoding, what parameters to use for the encoding (e.g., counter length, fixed or variable counter length, use of a prefix and/or suffix, hybrid encoding, and/or the like); and/or (3) one or more other encoding schemes such as entropy encoding and/or one or more parameters therefor.

In some embodiments, the selection logic 946 may select one or more encoding schemes 948 and/or parameters 950 in a static manner. For example, in some embodiments, the host 902 may provide information to the selection logic 946 relating to one or more patterns of entries that may be submitted by the host to a queue such as a number of entries for the queue, a frequency of entries for the queue, a spacing of entries for the queue, a uniformity of entries for the queue, and/or the like. For example, if the host 902 may be running a machine learning application, the host may be expected to continuously read data in a relatively regular access pattern most of the time, and therefore, commands may be written to a submission queue at relatively consistent intervals. As another example, if the host 902 may be running a terminal application that involves human input, the access pattern may be more sporadic with occasional bursts of closely spaced commands being written to a submission queue in a relatively short time frame, followed by a longer period with few or no command submissions. Based on receiving this type of information from the host 902, the selection logic 946 may select one or more encoding schemes 948 and/or parameters 950 that may be suitable for the expected pattern of queue entries. In some embodiments, the one or more selected encoding schemes 948 and/or parameters 950 may be used, for example, during a full power cycle. In some embodiments, the selection logic 946 may study the queue entry behavior during one power cycle and use this information to select one or more selected encoding schemes 948 and/or parameters 950 to use during another power cycle.

In some embodiments, the selection logic 946 may include static selection logic 952 that may be configured to select one or more encoding schemes 948 and/or parameters 950 in a dynamic manner. For example, in some embodiments, the selection logic 946 may select one or more initial encoding schemes 948 and/or parameters 950, and monitor and/or evaluate the effectiveness, efficiency, and/or the like, of the initial encoding schemes 948 and/or parameters 950. In some embodiments, the monitoring and/or evaluation may be performed during one or more windows (e.g., windows that may be preconfigured for specific durations of operation). Based on the monitoring and/or evaluation of the effectiveness, efficiency, and/or the like, the selection logic 946 may adjust the encoding schemes 948 and/or parameters 950 (e.g., select one or more different encoding schemes 948 and/or parameters 950) for use during a subsequent window. In some embodiments, the selection logic 946 may store one or more sets of encoding schemes 948 and/or parameters 950 in a table, and add a predefined marker to indicate a table index to use for the encoding following the marker. In some embodiments, the initial encoding schemes 948 and/or parameters 950 may be determined based on information provided by the host 902 as described above with respect to static selection. In some embodiments, the initial encoding schemes 948 and/or parameters 950 may be determined based on a best guess, previous behavior by the host 902, an application, and/or the like.

In some embodiments, the selection logic 946 may include dynamic selection logic 954 that may be configured to dynamically adjust the one or more encoding schemes 948 and/or parameters 950 based on one or more statistics relating to measurements (e.g., timestamps) relating to queue entries. For example, in some embodiments, the selection logic 946 may monitor an average time between command submissions to a submission queue. If the average time reaches a threshold (which may indicate, for example, that Δtimestamps are relatively large), the selection logic 946 may apply a lossy encoding scheme such as the logarithmic scheme illustrated in Table 3 either by itself, or on top of any other encoding that may be used.

Figure 10:
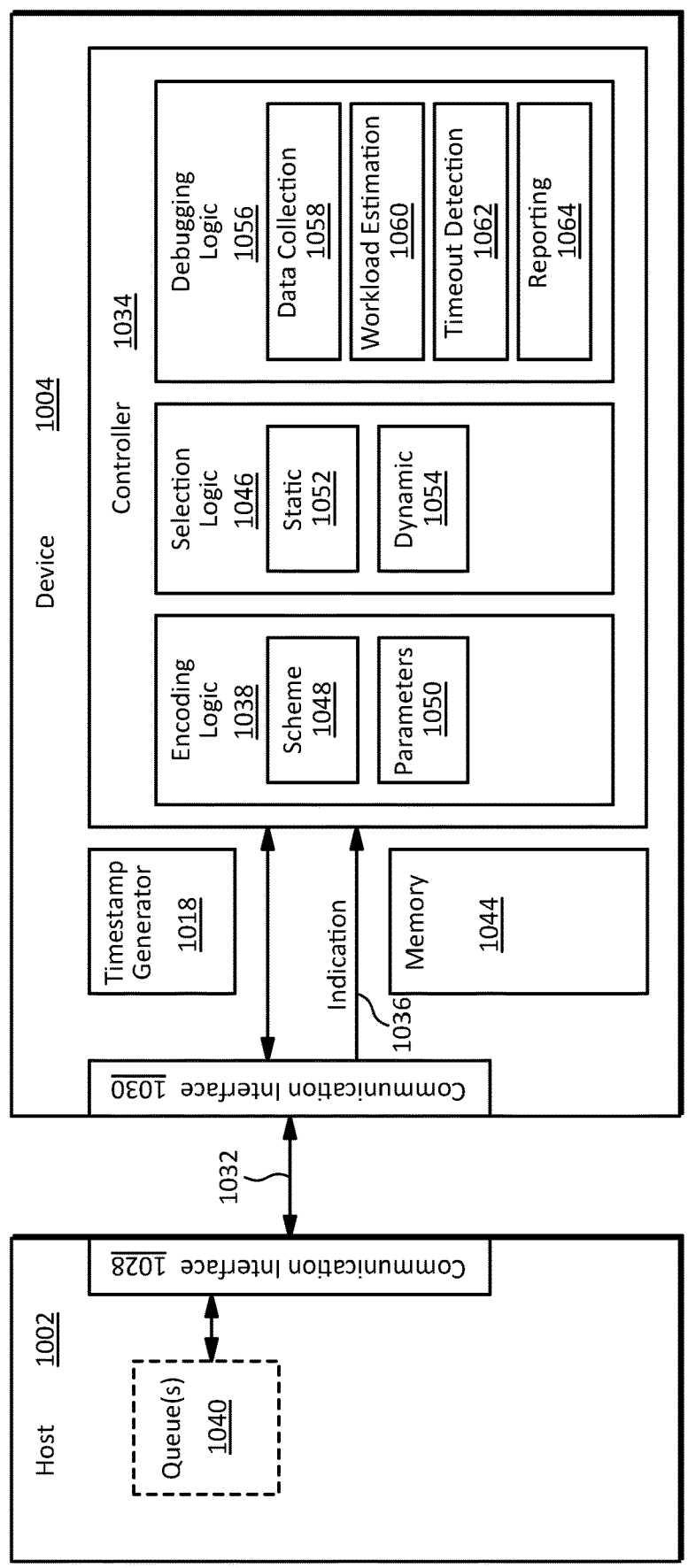
FIG. 10 illustrates an example embodiment of a system having queue monitoring with debugging in accordance with example embodiments of the disclosure.

FIG. 10 illustrates an example embodiment of a system having queue monitoring with debugging in accordance with example embodiments of the disclosure. The embodiment illustrated in FIG. 10 may be used, for example, to implement the embodiment illustrated in FIG. 4. The embodiment illustrated in FIG. 10 may include one or more components that may be similar to those illustrated in FIG. 9 and may be indicated by reference numbers ending in the same digits.

The embodiment illustrated in FIG. 10 may also include debugging logic 1056 which may be configured to manage, debug, profile, evaluate, and/or the like, entries in the one or more queues 1040 and or the device 1004, the host 1002, and/or an application, driver, process, utility, and/or the like running on the host 1002. The debugging logic 1056 may include data collection logic 1058, workload estimation logic 1060, timeout determination logic 1062, and/or reporting logic 1064. For purposes of illustration, some operations of the embodiment illustrated in FIG. 10 may be described in the context of command age related timeouts, for example, in a system that may implement NVMe. However, the embodiment illustrated in FIG. 10 is not limited to any specific context or implementation details.

In some embodiments, a command age related timeout may be triggered, for example, by: (1) a submission queue that may have one or more commands for relatively large workloads; (2) multiple queues that may have one or more commands for relatively large aggregated workloads; and/or (3) one or more underlying system and/or device issues. If a timeout has been detected, the debugging logic 1056 may be used to determine if the device 1004 malfunctioned. If a timeout has not been detected, the debugging logic 1056 may be used to determine if a timeout is likely to occur soon. Some additional examples of possible features of the debugging logic may include stop read recovery activity, for example, to adhere to time limited read recovery settings, and/or aborting a command.

In some embodiments, the data collection logic 1058 may collect data such as the amount of data transferred (e.g., the number of logic blocks (NLBs) transferred) based on one or more commands processed from one or more of the queues 1040 by the device 1004. The data collection logic 1058 may also collect and/or analyze data such as the number of commands processed by one or more of the queues 1040, and/or the average queue depth for the one or more of the queues 1040. In some embodiments, the data collection logic 1058 may determine and/or maintain an average command processing rate and/or an average data processing rate (e.g., number of NLBs) per submission queue (e.g., if all the queues are not empty).

If a timeout is detected (e.g., by the host 1002 and/or the timeout detection logic 1062), the workload estimation logic 1060 may determine whether the commands and/or amount of data transferred based on the commands, which may be adjusted by the average queue depth, reflects the command arbitration configuration for the one or more queues 1040. In some embodiments, if the commands and/or amount of data transferred based on the commands (optionally adjusted by the average queue depth) is consistent with the command arbitration configuration, it may be assumed that the timeout was not workload related and may have been caused by one or more underlying system and/or device issues. However, if the commands and/or amount of data transferred based on the commands (optionally adjusted by the average queue depth) are not consistent with the command arbitration configuration, it may be assumed that the timeout was caused by the performance (or a malfunction) of the device. In either case, the results may be reported, for example to the host 1002, by the reporting logic 1064.

In some embodiments, the workload estimation logic 1060 may perform a predictive analysis (e.g., even in the absence of a timeout detection) by determining an estimate (e.g., an instantaneous estimate) of the workload for one or more submission queues and/or for the aggregated workload for multiple submission queues (e.g., for the entire system), and report if the workload is greater than a predetermined threshold. In some embodiments, a workload exceeding a threshold may be predictive of an imminent and/or eventual timeout condition. For example, in some embodiments, the workload estimation logic 1060 may determine an estimated workload as follows: estimated workload=SUM(Average NLB processed for SQi, SQi Depth) for i=1 to n where SQi may indicate an individual submission queue and n may indicate the total number of submission queues. In some embodiments, if the estimated workload exceeds a threshold, the workload estimation logic 1060 may instruct the data collection logic 1058 to log some or all of the collected data for a debugging operation and/or instruct the reporting logic 1064 to report (e.g., to the host 1002 and/or a larger system) that a timeout may be likely and/or that there may be a system misconfiguration.

Figure 11:
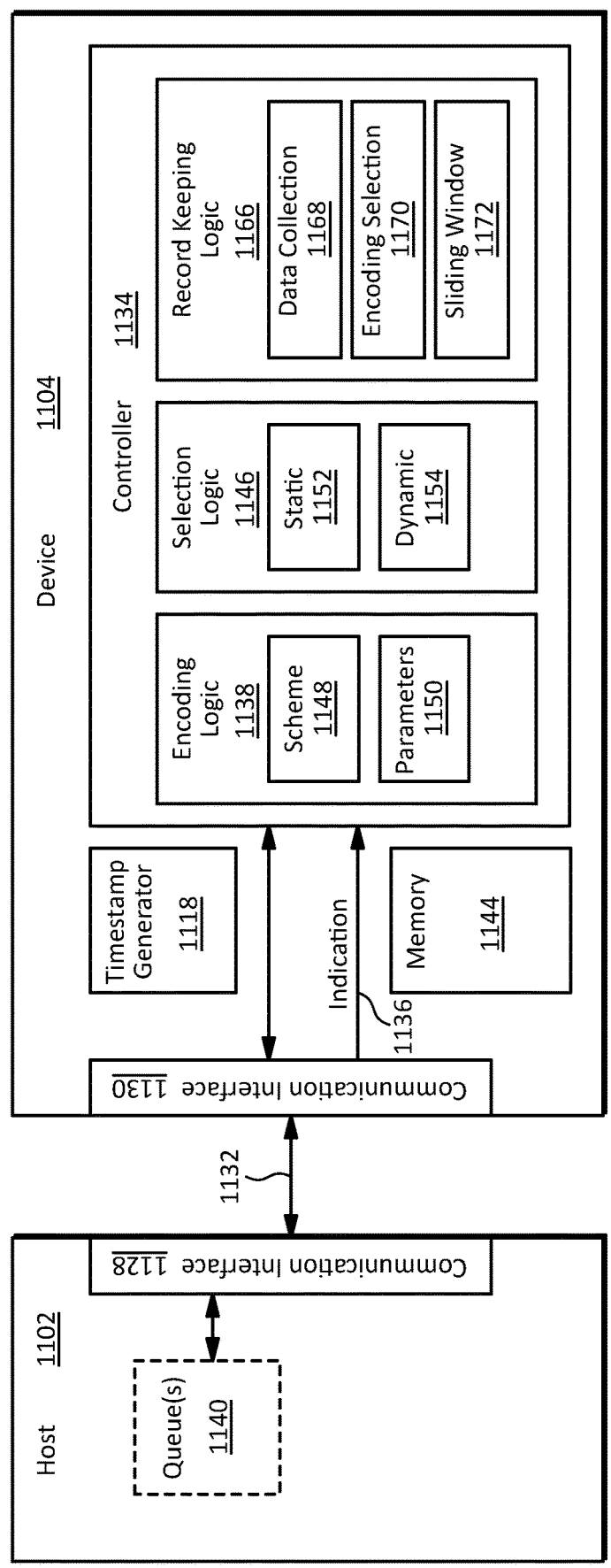
FIG. 11 illustrates an example embodiment of a system having queue monitoring with record keeping in accordance with example embodiments of the disclosure.

FIG. 11 illustrates an example embodiment of a system having queue monitoring with record keeping in accordance with example embodiments of the disclosure. The embodiment illustrated in FIG. 11 may be used, for example, to implement the embodiment illustrated in FIG. 4. The embodiment illustrated in FIG. 11 may include one or more components that may be similar to those illustrated in FIG. 9 and/or FIG. 10 and may be indicated by reference numbers ending in the same digits.

The embodiment illustrated in FIG. 11 may also include record keeping logic 1166 which, in some embodiments, may collect and/or store companion data relating to one or more amounts of data transferred by one or more entries, one or more timestamps or other measurements relating to one or more entries, and/or the like. In some embodiments, the record keeping logic 1166 may include data collection logic 1168, encoding selection logic 1170, and/or sliding window logic 1172. For purposes of illustration, some operations of the embodiment illustrated in FIG. 11 may be described in the context of command age related timeouts, for example, in a system that may implement NVMe. However, the embodiment illustrated in FIG. 11 is not limited to any specific context or implementation details.

For example, the record keeping logic 1166 may collect and/or save information relating to the amount of data transferred in connection with a command submitted to a command queue. In some embodiments, this amount of data may be referred to as a data transfer size. Collecting and/or saving a data transfer size may be useful, for example, for debugging one or more timeouts among commands that may have different data transfer sizes.

In some embodiments, a data transfer size may be measured in a number of logic blocks (NLBs). In some embodiments, a data transfer size may be stored as bit field (e.g., in NVMe) that may have any length (e.g., 16 bits).

In some embodiments, a data transfer size for a command may be collected (e.g., recorded) when the command is fetched from a queue, for example, by data collection logic 1168. (Depending on the implementation details, the data transfer size may not be available or determined until the command is fetched from the queue.) Some embodiments may collect and/or save a combination of a data transfer size and a timestamp for a command. Additionally, or alternatively, this type of technique may be used to modify a timestamp, for example, to mark an insertion of a command into a submission queue (e.g., rather than the time at which parsing inside the controller starts). Depending on the implementation details, this may generate a bit field record (e.g., a relatively long record) that may be useful for debugging a command timeout.

Encoding selection logic 1170 may implement one or more levels of encoding to reduce the amount of memory used to store a data transfer size and/or a combined data transfer size and timestamp for a command. For example, for a first level of encoding, the encoding selection logic 1170 may implement an encoding processing including one or more of the following operations in the following order or in any other order: (1) delta encoding to encode the timestamp difference (e.g., Δtimestamp) between commands; (2) quantization and/or rounding, for example, to reduce lower order information of delta values; and/or (3) entropy encoding (e.g., Huffman encoding) to further reduce quantized delta values.

As another example, for a second level of encoding, data transfer size and/or timestamp information may not be collected and/or stored for certain commands. For example, in some embodiments, data transfer size and/or a combined data transfer size and timestamp may only be collected and/or stored for commands having valid delta timestamps. In such an embodiment, the encoding selection logic 1170 may implement a process including one or more of the following operations in the following order or in any other order: (1) data transfer sizes for a selection and/or series of commands may be accumulated; (2) accumulation may start, for example, at a command having a valid delta timestamp; (3) an encoding process such as the first level encoding described above may be applied to compress and/or record one or more accumulated values with a subsequent (e.g., the next) delta timestamp; and/or (4) one or more accumulated values may be cleared (e.g., to zero) at a subsequent (e.g., the next) delta timestamp.

In some embodiments, the encoding selection logic 1170 may be implemented as part of the selection logic 1146. In some other embodiments, the encoding selection logic 1170 may be implemented at least partially separately, for example, to address one or more aspects of encoding selection that may be specific to the record keeping logic 1166. In some embodiments, after selecting one or more encoding schemes and/or parameters, the encoding selection logic 1170 may hand off the encoding operations to the encoding logic 1138 and store the resulting data, for example, in the local memory 1144.

As another example, the record keeping logic 1166 may collect and/or save one or more timestamps for one or more commands written to a submission queue. This may be useful, for example, to provide additional information for debugging a timeout. If a timestamp is removed and/or discarded after a command is fetched from a submission queue, it may reduce the amount of information available for debugging. For example, if occurs for a command in one submission queue, it may be useful to reference before-and-after command sequences of the current SQ and/or before-and-after command sequences of other submission queues. Moreover, a host may have a relatively long latency for detecting a timeout warning. In some embodiments, collecting and/or saving timestamps for one or more commands after fetching the one or more commands (e.g., after a completion for the command is placed in a corresponding completion queue) may be useful for debugging the timeout.

In some embodiments, the record keeping logic 1166 may collect and/or save one or more timestamps for one or more commands within a sliding time window. Additionally, or alternatively, the record keeping logic 1166 may collect and/or save one or more counts for a number of commands falling within one or more latency bins. In some embodiments, this may be implemented, for example, with one or more histograms of the latencies of the commands or other entries. In some embodiments, the sliding window logic 1172 may determine the size of a sliding window based, for example, on an amount of memory available to store the collected data, a time interval that may be relevant to one or more command timeouts, and/or the like. For example, in some embodiments, a sliding window may be based on twice the amount of memory that may be used for 64K entries per queue and/or twice the amount of time used for a timeout period. In some embodiments, one or more different offsets may be used to store one or more before-and-after command sequences (e.g., within a specified limit). In some embodiments, a data transfer size (e.g., NLB) may lag because, for example, one or more unfetched commands in a submission queue may not have corresponding data transfer size information. In such a situation, the data transfer size information may be recorded for a command after the command is fetched.

The arrangements of components in the embodiments illustrated in FIG. 4, FIG. 9, FIG. 10, and FIG. 11, are for purposes of illustration, and in other embodiments, some or all of components may be rearranged, combined, split, and/or the like, in other ways. For example, any of the one or more queues (440, 940, 1040, or 1140) timestamp generator (918, 1018, or 1118), local memory (944, 1044, or 1144), encoding logic (938, 1038, or 1138), selection logic (946, 1046, or 1146), debugging logic (1056), record keeping logic (1166), and/or the like may be located partially or entirely at a host and/or any other location. As another example, although the encoding logic, selection logic, debugging logic, and/or record keeping logic may be illustrated as part of a controller, in other embodiments, any or all of these components may be implemented partially or entirely as separate components, as parts of other components, and/or the like. As a further example, some embodiments may omit one or more components and/or functionality, and some embodiments may combine any or all of the components. For example, some embodiments may combine any or all of the encoding logic, selection logic, debugging logic, and/or record keeping logic in a single device.

In some embodiments, and depending on the implementation details, tracking one or more command ages as disclosed herein may provide in-field debugging capabilities, improved and/or consistent system performance, and/or the like. In some embodiments, the principles disclosed herein may enable firmware and/or system debugging by tracking overall latency. In some embodiments, a command entry to timestamp table may be compressed which, depending on the implementation details, may result in reduced memory usage. In some embodiments, the principles disclosed herein may enable the implementation of system wide command age tracking, for example, by reducing the amount of memory involved in tracking command ages.

Any of the functionality described herein, including any of the host functionality, device functionally, and/or the like (e.g., any of the one or more queues (440, 940, 1040, or 1140) timestamp generator (918, 1018, or 1118), local memory (944, 1044, or 1144), encoding logic (938, 1038, or 1138), selection logic (946, 1046, or 1146), debugging logic (1056), record keeping logic (1166), and/or the like), may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components may be implemented as a system-on-chip (SOC).

Figure 12:
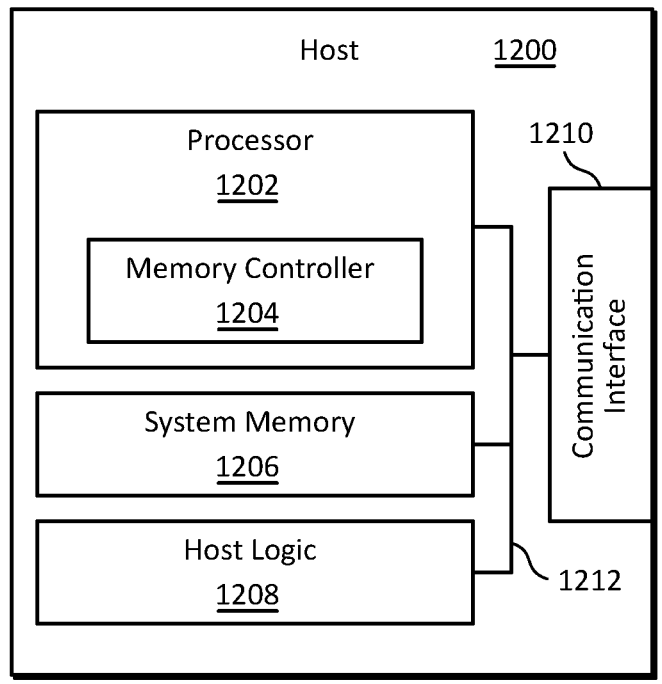
FIG. 12 illustrates an example embodiment of a host apparatus in accordance with example embodiments of the disclosure.

FIG. 12 illustrates an example embodiment of a host apparatus in accordance with example embodiments of the disclosure. The host apparatus illustrated in FIG. 12 may be used, for example, to implement any of the hosts disclosed herein. The host apparatus 1200 illustrated in FIG. 12 may include a processor 1202, which may include a memory controller 1204, a system memory 1206, host logic 1208, and/or a communication interface 1210. Any or all of the components illustrated in FIG. 12 may communicate through one or more system buses 1212. In some embodiments, one or more of the components illustrated in FIG. 12 may be implemented using other components. For example, in some embodiments, the host control logic 1208 may be implemented by the processor 1202 executing instructions stored in the system memory 1206 or other memory. In some embodiments, the host logic 1208 may implement any of the host functionality disclosed herein including, for example, any of the one or more queues (440, 940, 1040, or 1140), providing information to a device and/or selection logic relating to one or more patterns of entries that may be submitted by the host to a queue.

Figure 13:
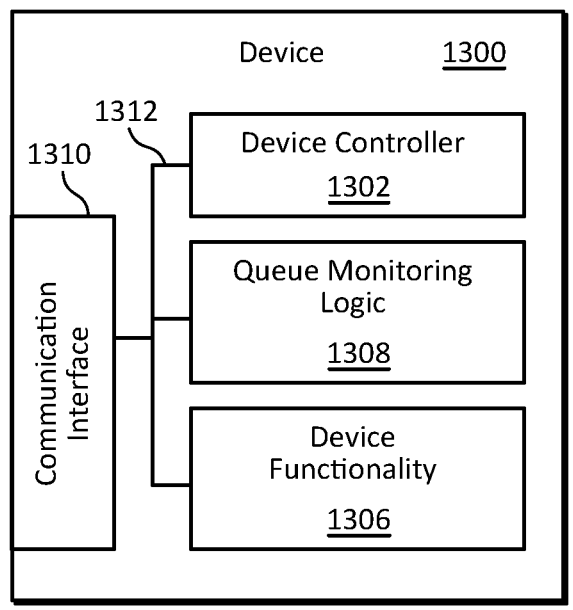
FIG. 13 illustrates an example embodiment of a device in accordance with example embodiments of the disclosure.

FIG. 13 illustrates an example embodiment of a device in accordance with example embodiments of the disclosure. The embodiment 1300 illustrated in FIG. 13 may be used, for example, to implement any of the devices disclosed herein. The device 1300 may include a device controller 1302, queue monitoring logic 1308, a device functionality circuit 1306, and/or a communication interface 1310. The components illustrated in FIG. 13 may communicate through one or more device buses 1312. The queue monitoring logic 1308 may be used, for example, to implement any of the one or more queues (440, 940, 1040, or 1140) timestamp generator (918, 1018, or 1118), local memory (944, 1044, or 1144), encoding logic (938, 1038, or 1138), selection logic (946, 1046, or 1146), debugging logic (1056), record keeping logic (1166), and/or the like.

The device functionality circuit 1306 may include any hardware to implement the primary function of the device 1300. For example, if the device 1300 is implemented as a storage device, the device functionality circuit 1306 may include a storage medium such as one or more flash memory devices, a flash translation layer (FTL), and/or the like. As another example, if the device 1300 is implemented as a network interface card (NIC), the device functionality circuit 1306 may include one or more modems, network interfaces, physical layers (PHYs), medium access control layers (MACs), and/or the like. As a further example, if the device 1300 is implemented as an accelerator, the device functionality circuit 1306 may include one or more accelerator circuits, memory circuits, and/or the like.

Figure 14:
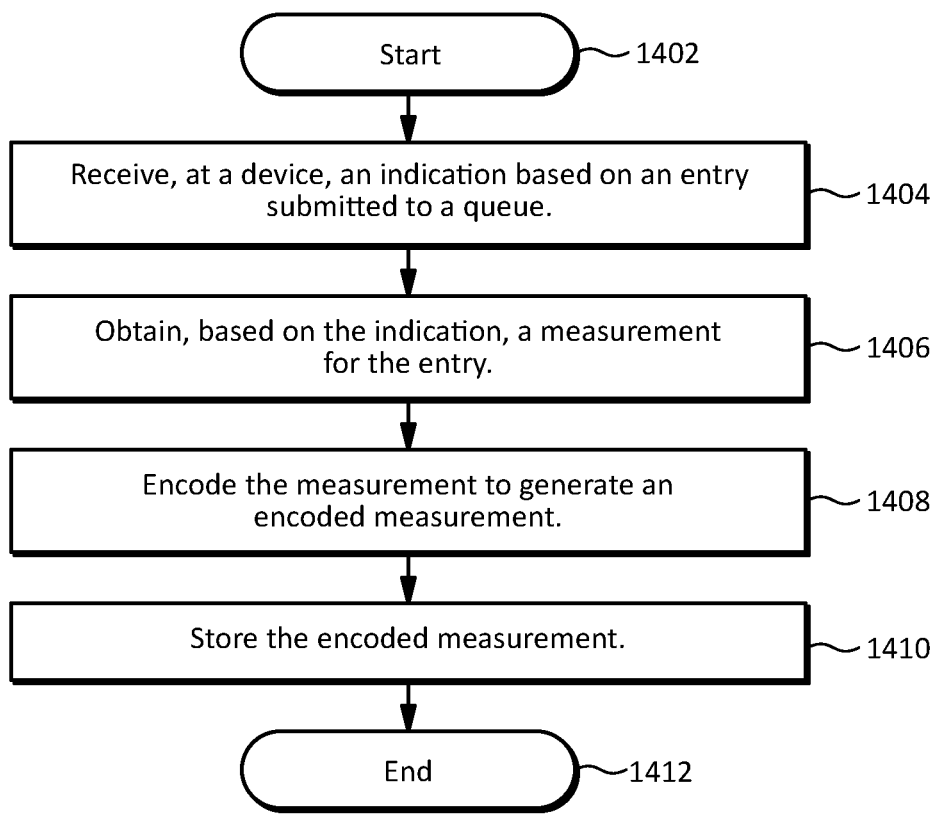
FIG. 14 illustrates an embodiment of a method for monitoring one or more queue entries in accordance with example embodiments of the disclosure.

FIG. 14 illustrates an embodiment of a method for monitoring one or more queue entries in accordance with example embodiments of the disclosure. The method may start at operation 1402. At operation 1404, the method may receive, at a device, an indication based on an entry submitted to a queue. In some embodiments, the indication may be implemented, for example, with a doorbell register. At operation 1406, the method may obtain, based on the indication, a measurement for the entry. For example, in some embodiments, the measurement may be implemented as a timestamp and/or a delta timestamp. At operation 1408, the method may encode the measurement to generate an encoded measurement. For example, the measurement may be encoded using one or more of measurement granularity and/or quantization, resetting a measurement based on a state of a queue (e.g., resetting a timestamp at the head of a queue), delta encoding, entropy encoding such as Huffman encoding, run length encoding, logarithmic encoding, rounding, and/or the like or any combination thereof. At operation 1410, the method may store the encoded measurement. The method may end at operation 1412.

The embodiment illustrated in FIG. 14, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
   receiving, at a device, an indication based on an entry submitted to a queue;
   obtaining, at the device, based on the indication, a timestamp for the entry;
   encoding, at the device, the timestamp to generate an encoded timestamp;
   storing, in a memory at the device, the encoded timestamp;
   performing, at the device, based on the entry, a processing operation;
   determining, at the device, based on the encoded timestamp, an age of the entry, wherein the age of the entry indicates a duration of the entry in the queue; and
   performing, based on the age of the entry, a debugging operation for the processing operation at the device.

2. The method of claim 1, wherein the encoding comprises one or more of delta encoding, entropy encoding, or run length encoding.

3. The method of claim 1, further comprising modifying the timestamp based on a status of the queue.

4. The method of claim 3, wherein:
   the status of the queue comprises an amount of entries in the queue; and
   the modifying the timestamp comprises setting the timestamp to a value.

5. The method of claim 3, wherein:
   the status of the queue comprises an empty queue; and
   the modifying the timestamp comprises resetting the timestamp.

6. The method of claim 1, wherein the encoding comprises encoding based on one or more parameters, the method further comprising determining at least one of the one or more parameters.

7. The method of claim 6, wherein:
   the one or more parameters comprises one or more encoding techniques; and
   the one more parameters comprises one or more settings for at least one of the one or more encoding techniques.

8. The method of claim 6, further comprising:
   receiving, at the device, information about one or more entries for the queue;
   wherein the determining at least one of the one or more parameters is based on at least a portion of the information.

9. The method of claim 8, wherein the information comprises one or more of a number of entries for the queue, a frequency of entries for the queue, a spacing of entries for the queue, or a uniformity of entries for the queue.

10. The method of claim 6, further comprising:
    determining a performance of a set of the one or more parameters;
    wherein the determining at least one of the one or more parameters is based, at least in part, on the performance of the set of one or more parameters.

11. The method of claim 10, wherein the performance comprises an efficiency of the encoding.

12. The method of claim 10, wherein the entry is a first entry, and the performance of the set of one or more parameters is based on a second entry submitted to the queue.

13. The method of claim 6, wherein the indication is a first indication, the timestamp is a first timestamp, and the entry is a first entry, the method further comprising:
    receiving, at the device, a second indication based on a second entry submitted to the queue; and
    obtaining, based on the second indication, a second timestamp for the second entry;
    wherein the determining at least one of the one or more parameters is based on the first timestamp and the second timestamp.

14. The method of claim 13, wherein the at least one of the one or more parameters comprises a lossy encoding technique.

15. The method of claim 1, further comprising:
    determining a data transfer size for the entry;
    encoding the data transfer size to generate an encoded data transfer size; and
    storing the encoded data transfer size.

16. The method of claim 1, further comprising:
    fetching the entry from the queue;
    performing the operation based on the fetching.

17. A device comprising:
    a storage medium; and
    a controller configured to:
      receive an indication of an entry submitted to a queue, wherein the entry comprises a command;
      obtain, based on the indication, a timestamp for the entry;
      encode the timestamp to generate an encoded timestamp;
      store the encoded timestamp;
      determine, based on the encoded timestamp, an age of the entry, wherein the age of the entry indicates a duration of the entry in the queue;

perform, based on the command and the encoded timestamp, an access operation to access the storage medium; and perform, based on the age of the entry, a debugging operation for the access operation.

18. The device of claim 17, further comprising indication logic configured to generate the indication.

19. A system comprising:

a host configured to submit an entry to a queue; and a device coupled to the host using a communication connection, wherein the device is configured to:

receive an indication of the entry submitted to the queue, wherein the entry comprises a command to access a storage medium at the device;

obtain, based on the indication, a timestamp for the entry;

encode the timestamp to generate an encoded timestamp;

store the encoded timestamp in a memory at the device;

perform, based on the entry, a processing operation;

determine, based on the encoded timestamp, an age of the entry, wherein the age of the entry indicates a duration of the entry in the queue; and perform, based on the age of the entry, a debugging operation for the processing operation.

20. The system of claim 19, wherein the host is configured to send, to the device, information about one or more entries for the queue.

* * * * *